United States Patent
Lin

(10) Patent No.: US 10,912,070 B2
(45) Date of Patent: Feb. 2, 2021

(54) METHOD AND APPARATUS FOR CONTROL CHANNEL TRANSMISSION IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/868,419

(22) Filed: Jan. 11, 2018

(65) Prior Publication Data

US 2018/0234955 A1 Aug. 16, 2018

Related U.S. Application Data

(60) Provisional application No. 62/457,693, filed on Feb. 10, 2017.

(51) Int. Cl.
| | |
|---|---|
| *H04W 72/04* | (2009.01) |
| *H04W 76/27* | (2018.01) |
| *H04W 88/08* | (2009.01) |
| *H04W 88/02* | (2009.01) |
| *H04L 5/00* | (2006.01) |
| *H04W 72/12* | (2009.01) |
| *H04B 7/26* | (2006.01) |

(52) U.S. Cl.
CPC ......... *H04W 72/042* (2013.01); *H04L 5/0053* (2013.01); *H04L 5/0094* (2013.01); *H04W 76/27* (2018.02); *H04B 7/2603* (2013.01); *H04L 5/0007* (2013.01); *H04W 72/1289* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,614,778 B1 | 9/2003 | Hwang | |
| 7,512,697 B2 * | 3/2009 | Lassen | H04L 67/32 341/50 |
| 2009/0073955 A1 | 3/2009 | Malladi | |
| 2010/0309857 A1 | 12/2010 | Kawamura | |
| 2011/0142076 A1 | 6/2011 | Ko | |
| 2018/0049165 A1 | 2/2018 | Byun et al. | |

FOREIGN PATENT DOCUMENTS

WO   2016/143968 A1   9/2016

OTHER PUBLICATIONS

On Common PDCCH for NR—3GPP TSG-RAN WG1 Meeting #88, Feb. 13-17, 2017.*

(Continued)

*Primary Examiner* — Yemane Mesfin
*Assistant Examiner* — Jeff Banthrongsack
(74) *Attorney, Agent, or Firm* — Cooper Legal Group, LLC

(57) ABSTRACT

A method and apparatus are disclosed from the perspective of a UE. In one embodiment, the method includes the UE receiving a configuration which indicates functionalities of each symbol within a set of symbols. The method also includes the UE determining a slot structure for a slot according to a group common PDCCH associated with the slot and the configuration.

18 Claims, 14 Drawing Sheets

(56) References Cited

OTHER PUBLICATIONS

Nokia et al: "On common PDCCh for MR", 3GPP Draft; R1-1703311_Common PDCCH Final, 3rd Generation Partnership Project (3GPP) Mobile Competence Centre; 650, Route Des Lucioles ; F-06921 Sophia-Antipolis Cedex ;France vol. RAN WG1, No. Athens, Greece; Feb. 13, 2017-Feb. 17, 2017 Feb. 6, 2017 (Feb. 6, 2017), XP051220463, Retrieved from the Internet: URL:http://www.3gpp.org/ftp/tsg_ran/WG1_RL1/TSGR1_88/Docs/.

Intel Corporation: "Group Common PDCCH", 3GPP Draft; RI-1702219 Group Common PDCCH, 3rd Generation Partnership Project (3GPP), Mobile Competence Centre ; 650m Route Des Lucioles ; F-06921 Sophia-Antipolis Cedex ;France vol. RAN WG1, No. Athens, Greece; Feb. 13, 2017-Feb. 17, 2017 Feb. 7, 2017 (Feb. 7, 2017), XP051221127, Retrieved from the Internet: URL:http://www.3gpp.org/ftp/tsg_ran/WG1_RL1/TSGR1_88/Docs/.

Qualcomm Incorporated: "View on group common PDCCH", 3GPP Draft; R1_1702626_Gr0up_Common PDCCH, 3rd Generation Partnership Project (3GPP), Mobile Competence Centre ; 650, Route Des Lucioles ; F-06921 Sophia Antipolis Cedex ;France vol. RAN WG1, No. Athens, Greece; Feb. 13, 2017-Feb. 18, 2017 Feb. 7, 2017 (Feb. 7, 2017), XP051221483, Retrieved from the Internet: URL: http://www.3gpp.org/ftp/tsg_ran/WG1_RL1/TSGR1_88/Docs/.

Ericsson: "Summary of e-mail discussions on downlink control signaling", 3GPP Draft; R1-1612908 Summary of E-Mail Discussion on Downlink Control Siganling, 3rd Generation Partnership Project (3GPP), Mobile Competence Centre ; 650, Route Des Lucioles ; F-06921 Sophia-Antip vol. RAN WG1, No. Reno, NV, USA; Nov. 14, 2016-Nov. 18, 2016 Nov. 13, 2016 (Nov. 13, 2016), XP051190931, Retrieved from the Internet.

European Search Report from corresponding EP Application No. 18151139.5, dated Jun. 15, 2018.

Intel Corporation, Group Common PDCCH, 3GPP TSG RAN WG1 #88 R1-1702219, Feb. 7, 2017, [Search Date : Jan. 18, 2019], Internet<URL:http://www.3gpp.org/ftp/tsg_ran/WG1_RL1/TSGR1_88/Docs/R1-1702219.zip>, Section 2.

Office Action from Japan Patent Office in corresponding JP Application No. 2018-002318, dated Jan. 29, 2019.

3GPP TSG-RAN WG1 Meeting #88, R1-1703311, Feb. 6, 2017.

3GPP TSG-RAN WG1 Meeting #88, R1-1702219, Feb. 7, 2017. END.

Notice of Submission of Opinion from the Korean Intellectual Property Office in corresponding KR Application No. 10-2018-0004075, dated Feb. 21, 2019.

Nokia et al, "On common PDCCH for NR", vol. RAN WG1, No. Athens, Greece; Feb. 13, 2017-Feb. 17, 2017, (Feb. 6, 2017), 3GPP Draft; R1-1703311_Common PDCCH_Final, 3rd Generation Partnership Project (3GPP), Mobile Competence Centre ; 650, Route Des Lucioles ; F-06921 Sophia-Antipolis Cedex ; France, Feb. 13, 2017.

Intel Corporation, "Group Common PDCCH", vol. Ran WG1, No. Athens, Greece; Feb. 13, 2017-Feb. 17, 2017, (Feb. 7, 2017), 3GPP Draft; R1-1702219 Group Common PDCCH, 3rd Generation Partnership Project (3GPP), Mobile Competence Centre ; 650, Route Des Lucioles ; F-06921 Sophia-Antipolis Cedex ; France Feb. 13, 2017.

Office Action from Intellectual Property India in corresponding IN Application No. 201814001197, dated Mar. 3, 2020.

Nokia, "On common PDCCH for NR," 3GPP TSG-RAN WG1 Meeting #88, R1-1703311, Feb. 6, 2017 , https://www.3gpp.org/ftp/tsg_ran/WG1_RL1/TSGR1_88/Docs/R1-1703311.zip.

Office Action from Taiwan Intellectual Patent Office in corresponding TW Application No. 1107101108, dated Dec. 27, 2019.

European Office Action from corresponding EP Application No. 18151139.5 dated Apr. 22, 2020, 8 pgs.

* cited by examiner

| Configuration | | $N_{sc}^{RB}$ | $N_{symb}^{DL}$ |
|---|---|---|---|
| Normal cyclic prefix | $\Delta f = 15$ kHz | 12 | 7 |
| Extended cyclic prefix | $\Delta f = 15$ kHz | | 6 |
| | $\Delta f = 7.5$ kHz | 24 | 3 |

FIG. 6 (PRIOR ART)

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

FIG. 7 (PRIOR ART)

| Physical channel | Modulation schemes |
|---|---|
| PCFICH | QPSK |

FIG. 8 (PRIOR ART)

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

FIG. 9 (PRIOR ART)

| Physical channel | Modulation schemes |
|---|---|
| PDCCH | QPSK |

FIG. 10 (PRIOR ART)

| Configuration | | Cyclic prefix length $N_{CP,l}$ |
|---|---|---|
| Normal cyclic prefix | $\Delta f = 15$ kHz | 160 for $l = 0$<br>144 for $l = 1,2,...,6$ |
| Extended cyclic prefix | $\Delta f = 15$ kHz | 512 for $l = 0,1,...,5$ |
| | $\Delta f = 7.5$ kHz | 1024 for $l = 0,1,2$ |

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

FIG. 14 (PRIOR ART)

| Transmission mode | DCI format | Search Space | Transmission scheme of PUSCH corresponding to PDCCH |
|---|---|---|---|
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
| | DCI format 4 | UE specific by C-RNTI | Closed-loop spatial multiplexing (see subclause 8.0.2) |

FIG. 15 (PRIOR ART)

| DCI format | Search Space |
|---|---|
| DCI format 1A | Common and UE specific by C-RNTI |

FIG. 16 (PRIOR ART)

| Value of resource allocation field | Allocated resource blocks |
|---|---|
| '000' | 0 |
| '001' | 1 |
| '010' | 2 |
| '011' | 3 |
| '100' | 4 |
| '101' | 5 |
| '110' | 0 and 1 |
| '111' | 2 and 3 |

FIG. 17 (PRIOR ART)

| Type | Search space $S_k^{(L)}$ | | Number of PDCCH candidates $M^{(L)}$ |
|---|---|---|---|
| | Aggregation level $L$ | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

FIG. 18 (PRIOR ART)

| Type | Search space $S_L^{(L)}$ | | Number of PDCCH candidates $M^{(L)}$ in first slot | Number of PDCCH candidates $M^{(L)}$ in second slot |
|---|---|---|---|---|
| | Aggregation level $L$ | Size [in CCEs] | | |
| UE-specific | 1 | 6 | 6 | 6 |
| | 2 | 12 | 6 | 6 |
| | 4 | 8 | 2 | 2 |
| | 8 | 16 | 2 | 2 |

FIG. 19 (PRIOR ART)

| pdcch-candidateReductions | Value of $a$ |
|---|---|
| 0 | 0 |
| 1 | 0.33 |
| 2 | 0.66 |
| 3 | 1 |

FIG. 20 (PRIOR ART)

METHOD AND APPARATUS FOR CONTROL CHANNEL TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/457,693 filed on Feb. 10, 2017, the entire disclosure of which is incorporated herein in its entirety by reference.

FIELD

This disclosure generally relates to wireless communication networks, and more particularly, to a method and apparatus for control channel transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving a configuration which indicates functionalities of each symbol within a set of symbols. The method also includes the UE determining a slot structure for a slot according to a group common PDCCH (Physical Downlink Control Channel) associated with the slot and the configuration.

BRIEF DESCRIPTION OF THE DRAWINGS

FIG. 6 is a reproduction of Table 6.2.3-1 of 3GPP TR 36.211 V13.1.0.

FIG. 7 is a reproduction of Table 6.7-1 of 3GPP TR 36.211 V13.1.0.

FIG. 8 is a reproduction of Table 6.7.2-1 of 3GPP TR 36.211 V13.1.0.

FIG. 9 is a reproduction of Table 6.8.1-1 of 3GPP TR 36.211 V13.1.0.

FIG. 10 is a reproduction of Table 6.8.3-1 of 3GPP TR 36.211 V13.1.0.

FIG. 14 is a reproduction of Table 8-1 of 3GPP TR 36.213 V13.1.1.

FIG. 15 is a reproduction of Table 8-3 of 3GPP TR 36.213 V13.1.1.

FIG. 16 is a reproduction of Table 8-4 of 3GPP TR 36.213 V13.1.1.

FIG. 17 is a reproduction of Table 8.1.3-1 of 3GPP TR 36.213 V13.1.1.

FIG. 18 is a reproduction of Table 9.1.1-1 of 3GPP TR 36.213 V13.1.1.

FIG. 19 is a reproduction of Table 9.1.1-1A of 3GPP TR 36.213 V13.1.1.

FIG. 20 is a reproduction of Table 9.1.1-2 of 3GPP TR 36.213 V13.1.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE", Ericsson, Huawei; TR 36.211 V13.1.0, "E-UTRA Study on latency reduction techniques for LTE (Release 13)"; TS 36.331, V13.2.0, "Evolved Universal Terrestrial Radio Access (E-UTRA); Radio Resource Control (RRC); Protocol specification (Release 13)"; TS 36.212 v13.1.0, "Evolved Universal Terrestrial Radio Access (E-UTRA); Multiplexing and channel coding (Release 13)"; TS 36.213 v13.1.1, "E-UTRA Physical layer procedures (Release 13)"; RAN1#86bis Chairman's note; and RAN1#87 Chairman's note. The standards and documents listed above are hereby expressly incorporated by reference in their entirety.

Figure 1:
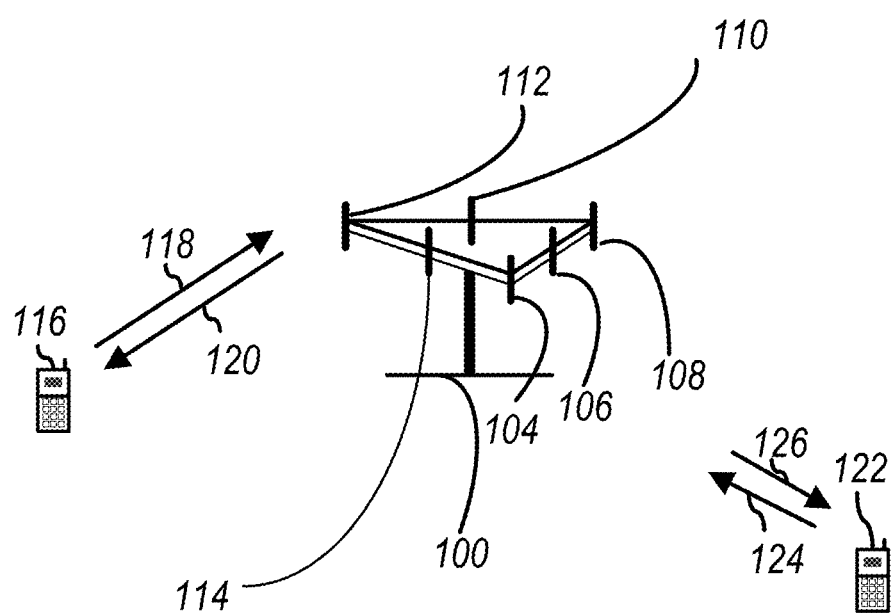
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
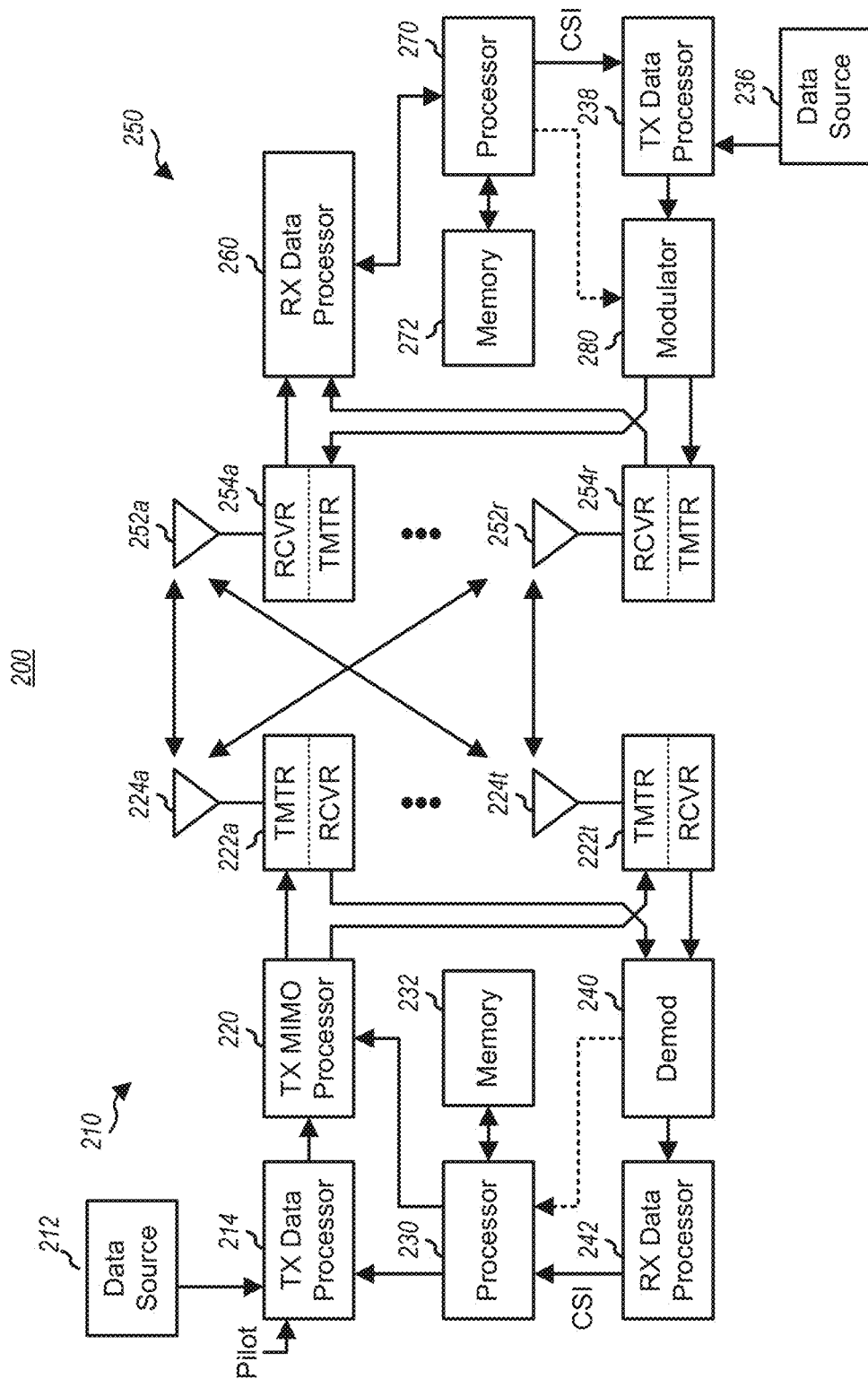
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
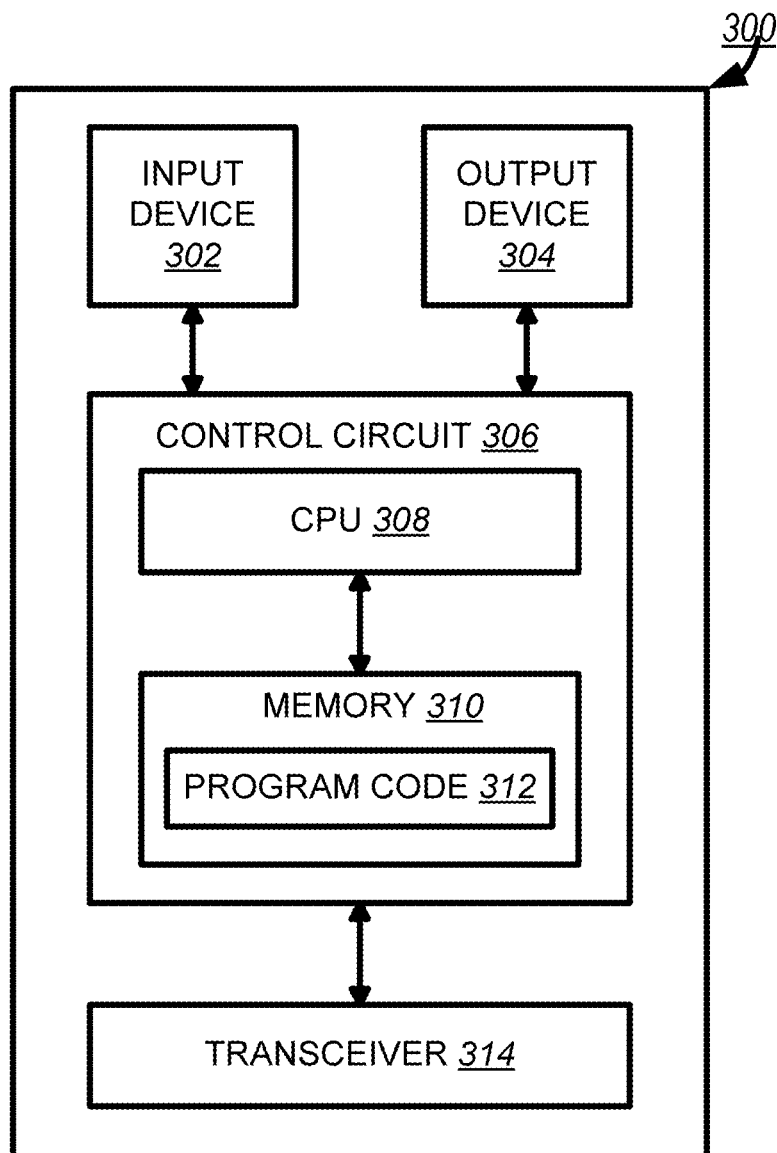
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
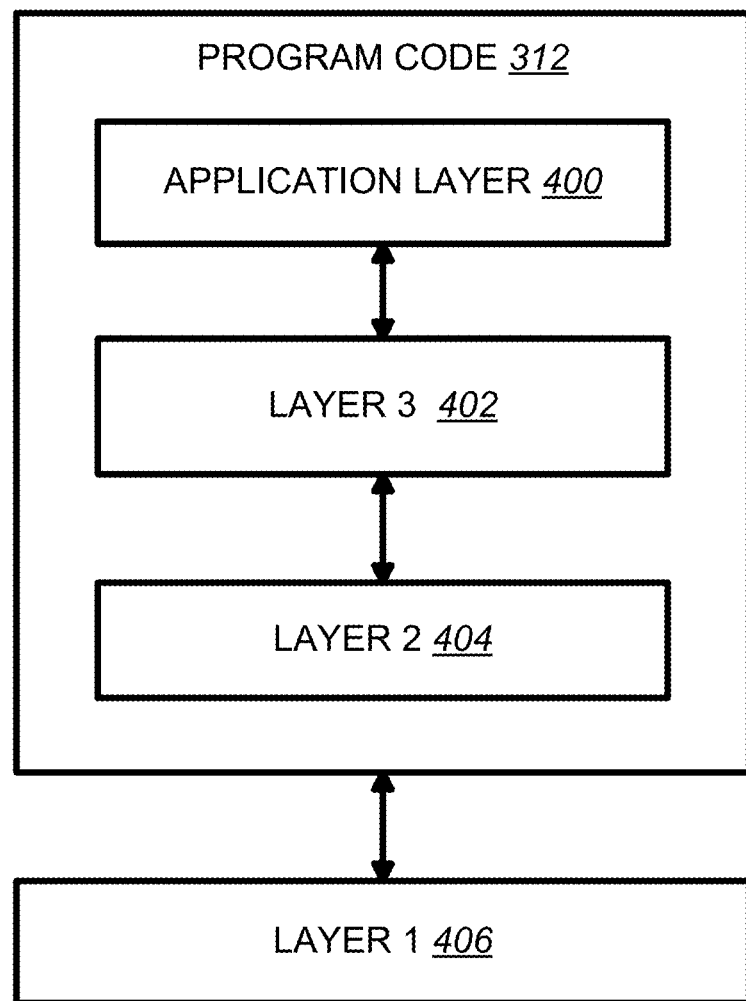
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is generally one of the important metrics for performance evaluation. Reducing packet data latency improves the system performance. In 3GPP RP-150465, the study item "study on latency reduction techniques for LTE" aims to investigate and standardize some techniques of latency reduction.

According to 3GPP RP-150465, the objective of the study item is to study enhancements to the E-UTRAN (Evolved Universal Terrestrial Radio Access Network) radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both FDD (Frequency Division Duplex) and TDD (Time Division Duplex) duplex modes are considered.

According to 3GPP RP-150465, two areas should be studies and documented as follows:

Fast Uplink Access Solutions
  For active UEs and UEs that have been inactive a longer time, but are kept in RRC Connected, focus should be on reducing user plane latency for the scheduled UL transmission and on getting a more resource efficient solution with protocol and signaling enhancements, compared to the pre-scheduling solutions allowed by the standard today, both with and without preserving the current TTI length and processing times TTI (Transmission Time Interval) Shortening and Reduced Processing Times
  Assess specification impact and study feasibility and performance of TTI lengths between 0.5 ms and one OFDM symbol, taking into account impact on reference signals and physical layer control signaling.

TTI shortening and processing time reduction can be considered as an effective solution for reducing latency, as the time unit for transmission can be reduced (e.g., from 1 ms (14 OFDM) symbol to 1~7 OFDM symbols), and the delay caused by decoding can be reduced as well. Another benefit of shortening TTI length is to support a finer granularity of transport block (TB) size, so that unnecessary padding could be reduced. On the other hand, reducing the length of TTI may also have significant impact to current system design as the physical channels are developed based on 1 ms structure. A shortened TTI is also called an sTTI.

Frame structure used in New RAT (NR) for 5G, to accommodate various type of requirement (as discussed in 3GPP RP-150465) for time and frequency resource, e.g. from ultra-low latency (~0.5 ms) to delay-tolerant traffic for MTC (Machine Type Communication), from high peak rate for eMBB (Enhanced Mobile Broadband) to very low data rate for MTC. An important focus of this study is low latency aspect, e.g., short TTI, while other aspect of mixing or adapting different TTIs can also be considered in the study. In addition to diverse services and requirements, forward compatibility is an important consideration in initial NR frame structure design as not all features of NR would be included in the beginning phase or release.

Reducing latency of protocol is an important improvement between different generations or releases, which can improve efficiency as well as meeting new application requirements, e.g., real-time service. An effective method frequently adopted to reduce latency is to reduce the length of TTIs, from 10 ms in 3G to 1 ms in LTE. In the context of LTE-A Pro in RE1-14, SI or WI was proposed to reduce the TTI to sub-ms level, e.g. 0.1-0.5 ms, by reducing the number of OFDM (Orthogonal Frequency Division Multiplexing) symbols within a TTI, without changing any existing LTE numerology, i.e., in LTE there is only one numerology. The target of this improvement can be to solve the TCP (Transport Control Protocol) slow start issue, extremely low but frequent traffic, or to meet foreseen ultra-low latency in NR to some extent. Processing time reduction is another consideration to reduce the latency. It has not yet concluded that whether short TTI and short processing time always come together. The study suffers from some limitation, as the method adopted should preserve backward compatibility, e.g., the existence of legacy control region. A brief description of LTE numerology is given below (as discussed in 3GPP TR 36.211):

6 Downlink 6.1 Overview

The smallest time-frequency unit for downlink transmission is denoted a resource element and is defined in clause 6.2.2.

A subset of the downlink subframes in a radio frame on a carrier supporting PDSCH transmission can be configured as MBSFN subframes by higher layers. Each MBSFN subframe is divided into a non-MBSFN region and an MBSFN region.

The non-MBSFN region spans the first one or two OFDM symbols in an MBSFN subframe where the length of the non-MBSFN region is given according to Sub-clause 6.7.
  The MBSFN region in an MBSFN subframe is defined as the OFDM symbols not used for the non-MBSFN region.

For frame structure type 3, MBSFN configuration shall not be applied to downlink subframes in which at least one OFDM symbol is not occupied or discovery signal is transmitted.

Unless otherwise specified, transmission in each downlink subframe shall use the same cyclic prefix length as used for downlink subframe #0.

6.1.1 Physical Channels

A downlink physical channel corresponds to a set of resource elements carrying information originating from higher layers and is the interface defined between 3GPP TS 36.212 [3] and the present document 3GPP TS 36.211.

The following downlink physical channels are defined:
  Physical Downlink Shared Channel, PDSCH
  Physical Broadcast Channel, PBCH
  Physical Multicast Channel, PMCH
  Physical Control Format Indicator Channel, PCFICH
  Physical Downlink Control Channel, PDCCH
  Physical Hybrid ARQ Indicator Channel, PHICH
  Enhanced Physical Downlink Control Channel, EPDCCH
  MTC Physical Downlink Control Channel, MPDCCH

6.1.2 Physical Signals

A downlink physical signal corresponds to a set of resource elements used by the physical layer but does not carry information originating from higher layers. The following downlink physical signals are defined:

Reference signal
Synchronization signal
Discovery signal

6.2 Slot Structure and Physical Resource Elements
6.2.1 Resource Grid

The transmitted signal in each slot is described by one or several resource grids of $N_{RB}^{DL} N_{sc}^{RB}$ subcarriers and $N_{symb}^{DL}$ OFDM symbols. The resource grid structure is illustrated in FIG. 6.2.2-1. The quantity $N_{RB}^{DL}$ depends on the downlink transmission bandwidth configured in the cell and shall fulfil $$N_{RB}^{min,DL} \le N_{RB}^{DL} \le N_{RB}^{max,DL}$$

where $N_{RB}^{min,DL}=6$ and $N_{RB}^{max,DL}=110$ are the smallest and largest downlink bandwidths, respectively, supported by the current version of this specification.

The set of allowed values for $N_{RB}^{DL}$ is given by 3GPP TS 36.104 [6]. The number of OFDM symbols in a slot depends on the cyclic prefix length and subcarrier spacing configured and is given in Table 6.2.3-1.

An antenna port is defined such that the channel over which a symbol on the antenna port is conveyed can be inferred from the channel over which another symbol on the same antenna port is conveyed. For MBSFN reference signals, positioning reference signals, UE-specific reference signals associated with PDSCH and demodulation reference signals associated with EPDCCH, there are limits given below within which the channel can be inferred from one symbol to another symbol on the same antenna port. There is one resource grid per antenna port. The set of antenna ports supported depends on the reference signal configuration in the cell:

Cell-specific reference signals support a configuration of one, two, or four antenna ports and are transmitted on antenna ports p=0, p∈{0, 1}, and p∈{0, 1, 2, 3}, respectively.

MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.

UE-specific reference signals associated with PDSCH are transmitted on antenna port(s) p=5, p=7, p=8, or one or several of p∈{7, 8, 9, 10, 11, 12, 13, 14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Demodulation reference signals associated with EPDCCH are transmitted on one or several of p∈{107, 108, 109, 110}. The channel over which a symbol on one of these antenna ports is conveyed can be inferred from the channel over which another symbol on the same antenna port is conveyed only if the two symbols are in the same PRB pair.

Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15, 16, p=15, . . . , 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

6.2.2 Resource Elements

Each element in the resource grid for antenna port p is called a resource element and is uniquely identified by the index pair (k,l) in a slot where k=0, . . . , $N_{RB}^{DL} N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$.

When there is no risk for confusion, or no particular antenna port is specified, the index p may be dropped.

Figure 5:
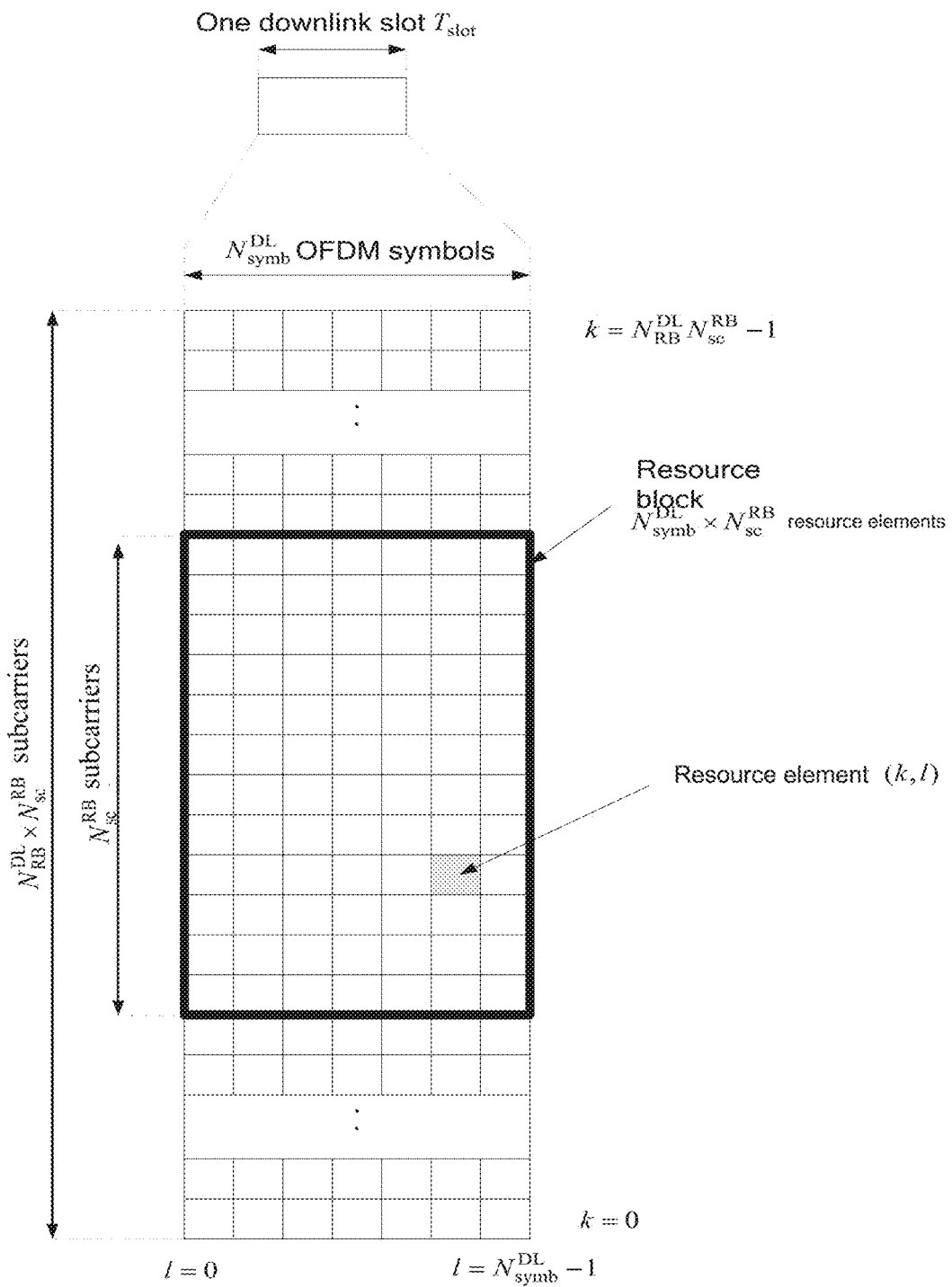
FIG. 5 is a reproduction of FIG. 6.2.2-1 of 3GPP TR 36.211 V13.1.0.

FIG. 6.2.2-1 of 3GPP TR 36.211 V13.1.0, Entitled "Downlink Resource Grid", is Reproduced as FIG. 5

6.2.3 Resource Blocks

Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1. A physical resource block thus consists of $N_{symb}^{DL} \times N_{sc}^{RB}$ resource elements, corresponding to one slot in the time domain and 180 kHz in the frequency domain.

Physical resource blocks are numbered from 0 to $N_{RB}^{DL}-1$ in the frequency domain. The relation between the physical resource block number $n_{PRB}$ in the frequency domain and resource elements (k,l) in a slot is given by $$n_{PRB} = \left\lfloor \frac{k}{N_{sc}^{RB}} \right\rfloor$$

Table 6.2.3-1 of 3GPP TR 36.211 V13.1.0, Entitled "Physical Resource Blocks Parameters", is Reproduced as FIG. 6

A physical resource-block pair is defined as the two physical resource blocks in one subframe having the same physical resource-block number $n_{PRB}$.

A virtual resource block is of the same size as a physical resource block. Two types of virtual resource blocks are defined:

Virtual resource blocks of localized type
Virtual resource blocks of distributed type For each type of virtual resource blocks, a pair of virtual resource blocks over two slots in a subframe is assigned together by a single virtual resource block number, $n_{VRB}$.

[ . . . ]

6.7 Physical Control Format Indicator Channel

The physical control format indicator channel carries information about the number of OFDM symbols used for transmission of PDCCHs in a subframe. The set of OFDM symbols possible to use for PDCCH in a subframe is given by Table 6.7-1.

Table 6.7-1 of 3GPP TR 36.211 V13.1.0, Entitled "Number of OFDM Symbols Used for PDCCH", is Reproduced as FIG. 7

The UE may assume the PCFICH is transmitted when the number of OFDM symbols for PDCCH is greater than zero unless stated otherwise in [4, clause 12].

6.7.1 Scrambling

The block of bits $b(0), \ldots, b(31)$ transmitted in one subframe shall be scrambled with a cell-specific sequence prior to modulation, resulting in a block of scrambled bits $\tilde{b}(0), \ldots, \tilde{b}(31)$ according to $$\tilde{b}(i)=(b(i)+c(i)) \bmod 2$$

where the scrambling sequence $c(i)$ is given by clause 7.2. The scrambling sequence generator shall be initialised with $c_{init}=(\lfloor n_s/2 \rfloor+1) \cdot (2N_{ID}^{cell}+1) \cdot 2^9 + N_{ID}^{cell}$ at the start of each subframe.

6.7.2 Modulation

The block of scrambled bits $\tilde{b}(0), \ldots, \tilde{b}(31)$ shall be modulated as described in clause 7.1, resulting in a block of complex-valued modulation symbols $d(0), \ldots, d(15)$. Table 6.7.2-1 specifies the modulation mappings applicable for the physical control format indicator channel.

Table 6.7.2-1 of 3GPP TR 36.211 V13.1.0, Entitled "PCFICH Modulation Schemes", is Reproduced as FIG. 8

6.7.3 Layer Mapping and Precoding

The block of modulation symbols $d(0), \ldots, d(15)$ shall be mapped to layers according to one of clauses 6.3.3.1 or 6.3.3.3 with $M_{symb}^{(0)}=16$ and precoded according to one of clauses 6.3.4.1 or 6.3.4.3, resulting in a block of vectors $y(i)=[y^{(0)}(i) \ldots y^{(P-1)}(i)]^T$, $i=0, \ldots, 15$, where $y^{(p)}(i)$ represents the signal for antenna port p and where $p=0, \ldots, P-1$ and the number of antenna ports for cell-specific reference signals $P \in \{1, 2, 4\}$. The PCFICH shall be transmitted on the same set of antenna ports as the PBCH.

6.7.4 Mapping to Resource Elements

The mapping to resource elements is defined in terms of quadruplets of complex-valued symbols. Let $z^{(p)}(i)=\langle y^{(p)}(4i), y^{(p)}(4i+1), y^{(p)}(4i+2), y^{(p)}(4i+3) \rangle$ denote symbol quadruplet i for antenna port p. For each of the antenna ports, symbol quadruplets shall be mapped in increasing order of i to the four resource-element groups in the first OFDM symbol in a downlink subframe or DwPTS with the representative resource-element as defined in clause 6.2.4 given by

- $z^{(p)}(0)$ is mapped to the resource-element group represented by $k=\bar{k}$
- $z^{(p)}(1)$ is mapped to the resource-element group represented by $k=\bar{k}+\lfloor N_{RB}^{DL}/2 \rfloor \cdot N_{sc}^{RB}/2$
- $z^{(p)}(2)$ is mapped to the resource-element group represented by $k=\bar{k}+\lfloor 2N_{RB}^{DL}/2 \rfloor \cdot N_{sc}^{RB}/2$
- $z^{(p)}(3)$ is mapped to the resource-element group represented by $k=\bar{k}+\lfloor 3N_{RB}^{DL}/2 \rfloor \cdot N_{sc}^{RB}/2$ where the additions are modulo $N_{RB}^{DL} N_{sc}^{RB}$, $$\bar{k}=(N_{sc}^{RB}/2) \cdot (N_{ID}^{cell} \bmod 2N_{RB}^{DL})$$

and $N_{ID}^{cell}$ is the physical-layer cell identity as given by clause 6.11.

6.8 Physical Downlink Control Channel

6.8.1 PDCCH Formats

The physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. The PDCCH supports multiple formats as listed in Table 6.8.1-1. A PDCCH consisting of n consecutive CCEs may only start on a CCE fulfilling i mod n=0, where i is the CCE number.

Multiple PDCCHs can be transmitted in a subframe.

Table 6.8.1-1 of 3GPP TR 36.211 V13.1.0, Entitled "Supported PDCCH Formats", is Reproduced as FIG. 9

6.8.2 PDCCH Multiplexing and Scrambling

The block of bits $b^{(i)}(0), \ldots, b^{(i)}(M_{bit}^{(i)}-1)$ on each of the control channels to be transmitted in a subframe, where $M_{bit}^{(i)}$ is the number of bits in one subframe to be transmitted on physical downlink control channel number i, shall be multiplexed, resulting in a block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ where $n_{PDCCH}$ is the number of PDCCHs transmitted in the subframe.

The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ shall be scrambled with a cell-specific sequence prior to modulation, resulting in a block of scrambled bits $\tilde{b}(0), \ldots, \tilde{b}(M_{tot}-1)$ according to $$\tilde{b}(i)=(b(i)+c(i)) \bmod 2$$

where the scrambling sequence $c(i)$ is given by clause 7.2. The scrambling sequence generator shall be initialised with $c_{init}=\lfloor n_s/2 \rfloor 2^{9*}+N_{ID}^{cell}$ at the start of each subframe.

CCE number n corresponds to bits $b(72n), b(72n+1), \ldots, b(72n+71)$. If necessary, <NIL> elements shall be inserted in the block of bits prior to scrambling to ensure that the PDCCHs starts at the CCE positions as described in 3GPP TS 36.213 [4] and to ensure that the length $M_{tot}=8N_{REG} \geq \sum_{i=0}^{n_{PDCCH}-1} M_{bit}^{(i)}$ of the scrambled block of bits matches the amount of resource-element groups not assigned to PCFICH or PHICH.

6.8.3 Modulation

The block of scrambled bit $\tilde{b}(0), \ldots, \tilde{b}(M_{tot}-1)$ shall be modulated as described in clause 7.1, resulting in a block of complex-valued modulation symbols $d(0), \ldots, d(M_{symb}-1)$. Table 6.8.3-1 specifies the modulation mappings applicable for the physical downlink control channel.

Table 6.8.3-1 of 3GPP TR 36.211 V13.1.0, Entitled "PDCCH Modulation Schemes", is Reproduced as FIG. 10

6.8.4 Layer Mapping and Precoding

The block of modulation symbols $d(0), \ldots, d(M_{symb}-1)$ shall be mapped to layers according to one of clauses 6.3.3.1 or 6.3.3.3 with $M_{symb}^{(0)}=M_{symb}$ and precoded according to one of clauses 6.3.4.1 or 6.3.4.3, resulting in a block of vectors $y(i)=[y^{(0)}(i) \ldots y^{(P-1)}(i)]^T$, $i=0, \ldots, M_{symb}-1$ to be mapped onto resources on the antenna ports used for transmission, where $y^{(p)}(i)$ represents the signal for antenna port p. The PDCCH shall be transmitted on the same set of antenna ports as the PBCH.

6.8.5 Mapping to Resource Elements

The mapping to resource elements is defined by operations on quadruplets of complex-valued symbols. Let $z^{(p)}(i)=\langle y^{(p)}(4i), y^{(p)}(4i+1), y^{(p)}(4i+2), y^{(p)}(4i+3)\rangle$ denote symbol quadruplet i for antenna port p.

The block of quadruplets $z^{(p)}(0), \ldots, z^{(p)}(M_{quad}-1)$, where $M_{quad}=M_{symb}/4$, shall be permuted resulting in $w^{(p)}(0), \ldots, w^{(p)}(M_{quad}-1)$. The permutation shall be according to the sub-block interleaver in clause 5.1.4.2.1 of 3GPP TS 36.212 [3] with the following exceptions:

the input and output to the interleaver is defined by symbol quadruplets instead of bits interleaving is performed on symbol quadruplets instead of bits by substituting the terms "bit", "bits" and "bit sequence" in clause 5.1.4.2.1 of 3GPP TS 36.212 [3] by "symbol quadruplet", "symbol quadruplets" and "symbol-quadruplet sequence", respectively <NULL> elements at the output of the interleaver in 3GPP TS 36.212 [3] shall be removed when forming $w^{(p)}(0), \ldots, w^{(p)}(M_{quad}-1)$. Note that the removal of <NULL> elements does not affect any <NIL> elements inserted in clause 6.8.2.

The block of quadruplets $w^{(p)}(0), \ldots, w^{(p)}(M_{quad}-1)$ shall be cyclically shifted, resulting in $\overline{w}^{(p)}(0), \ldots, \overline{w}^{(p)}(M_{quad}-1)$ where $\overline{w}^{(p)}(i)=w^{(p)}((i+N_{ID}^{cell}) \mod M_{quad})$.

Mapping of the block of quadruplets $\overline{w}^{(p)}(0), \ldots, \overline{w}^{(p)}(M_{quad}-1)$ is defined in terms of resource-element groups, specified in clause 6.2.4, according to steps 1-10 below:

1) Initialize m'=0 (resource-element group number)
2) Initialize k'=0
3) Initialize l'=0
4) If the resource element (k',l') represents a resource-element group and the resource-element group is not assigned to PCFICH or PHICH then perform step 5 and 6, else go to step 7
5) Map symbol-quadruplet $\overline{w}^{(p)}(m')$ to the resource-element group represented by (k',l') for each antenna port p
6) Increase m' by 1
7) Increase l' by 1
8) Repeat from step 4 if l'<L, where L corresponds to the number of OFDM symbols used for PDCCH transmission as indicated by the sequence transmitted on the PCFICH
9) Increase k' by 1
10) Repeat from step 3 if $k' < N_{RB}^{DL} \cdot N_{sc}^{RB}$

[ . . . ]

6.12 OFDM Baseband Signal Generation

The time-continuous signal $s_l^{(p)}(t)$ on antenna port p in OFDM symbol l in a downlink slot is defined by $$s_l^{(p)}(t) = \sum_{k=-\lfloor N_{RB}^{DL}N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lceil N_{RB}^{DL}N_{sc}^{RB}/2 \rceil} a_{k^{(+)},l}^{(p)} \cdot e^{j2\pi k \Delta f(t-N_{CP,l}T_s)}$$

for $0 \le t < (N_{CP,l}+N) \times T_s$ where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor -1$. The variable N equals 2048 for $\Delta f=15$ kHz subcarrier spacing and 4096 for $\Delta f=7.5$ kHz subcarrier spacing.

The OFDM symbols in a slot shall be transmitted in increasing order of l, starting with l=0, where OFDM symbol l>0 starts at time $\Sigma_{l'=0}^{l-1}(N_{CP,l'}+N)T_s$ within the slot. In case the first OFDM symbol(s) in a slot use normal cyclic prefix and the remaining OFDM symbols use extended cyclic prefix, the starting position the OFDM symbols with extended cyclic prefix shall be identical to those in a slot where all OFDM symbols use extended cyclic prefix. Thus there will be a part of the time slot between the two cyclic prefix regions where the transmitted signal is not specified.

Table 6.12-1 lists the value of $N_{CP,l}$ that shall be used. Note that different OFDM symbols within a slot in some cases have different cyclic prefix lengths.

Figures 11, 12:
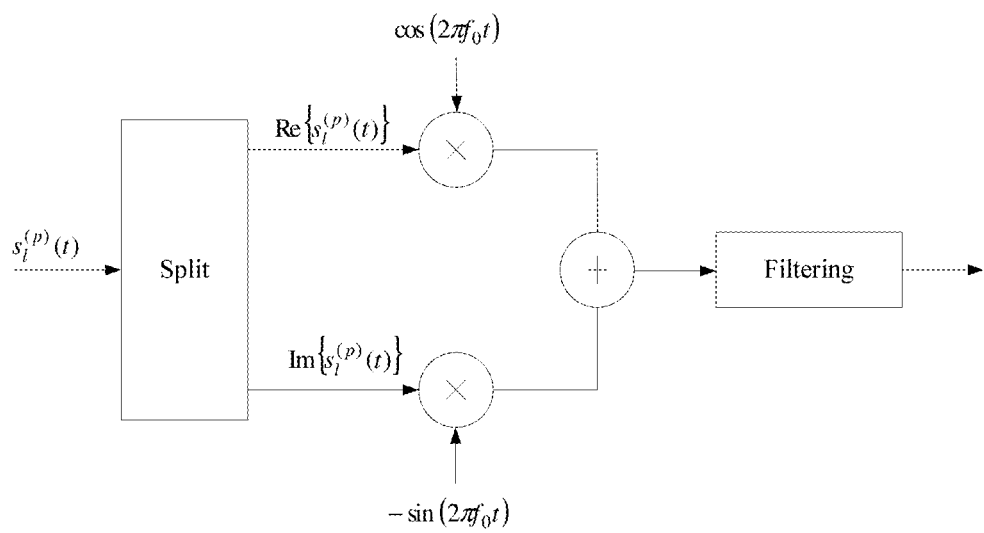
FIG. 11 is a reproduction of Table 6.12-1 of 3GPP TR 36.211 V13.1.0.
FIG. 12 is a reproduction of FIGS. 6.13-1 of 3GPP TR 36.211 V13.1.0.

Table 6.12-1 of 3GPP TR 36.211 V13.1.0, Entitled "OFDM Parameters", is Reproduced as FIG. 11

6.13 Modulation and Upconversion

Modulation and upconversion to the carrier frequency of the complex-valued OFDM baseband signal for each antenna port is shown in FIGS. 6.13-1. The filtering required prior to transmission is defined by the requirements in 3GPP TS 36.104 [6].

FIGS. 6.13-1 of 3GPP TR 36.211 V13.1.0, Entitled "Downlink Modulation", is Reproduced as FIG. 12

In LTE, there is only one DL (Downlink) numerology defined for initial access, which is 15 KHz subcarrier spacing and the signal and channel to be acquired during initial access is based on 15 KHz numerology. To access a cell, UE may need to acquire some fundamental information. For example, UE first acquires time or frequency synchronization of cell, which is done during cell search or cell selection or reselection. The time or frequency synchronization can be obtained by receiving synchronization signal, such as primary synchronization signal (PSS) or secondary synchronization signal (SSS). During synchronization, the center frequency of a cell is known, and the subframe or frame boundary is obtained. Cyclic prefix (CP) of the cell, e.g., normal CP or extended CP, duplex mode of the cell, e.g., FDD or TDD can be known as well when PSS/SSS are acquired. And then, a master information block (MIB) carried on physical broadcast channel (PBCH) is received, some fundamental system information, e.g., system frame number (SFN), system bandwidth, physical control channel related information. The UE would receive the DL control channel (e.g., PDCCH (Physical Downlink Control Channel) on proper resource elements and with proper payload size according to the system bandwidth and can acquire some more system information required to access the cell in system information block (SIB), such as whether the cell can be access, UL bandwidth and frequency, random access parameter, and so on. The UE then can perform random access and request the connection to the cell. After the connection set up is complete, the UE would enter connected mode and be able to perform data transmission to the cell or perform data reception from the cell. The resource allocation for data reception and transmission is done according to system bandwidth (e.g., $N_{RB}^{DL}$ or $N_{RB}^{UL}$ in the following quotation) signaled in MIB or SIB. More details can be found in 3GPP TR 36.211, TS 36.331, TS 36.212, and TS 36.213 as follows:

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

FIG. 5.3.3-1 shows the processing structure for one DCI. The following coding steps can be identified:

Information element multiplexing
CRC attachment
Channel coding
Rate matching

The coding steps for DCI are shown in the figure below.

Figure 13:
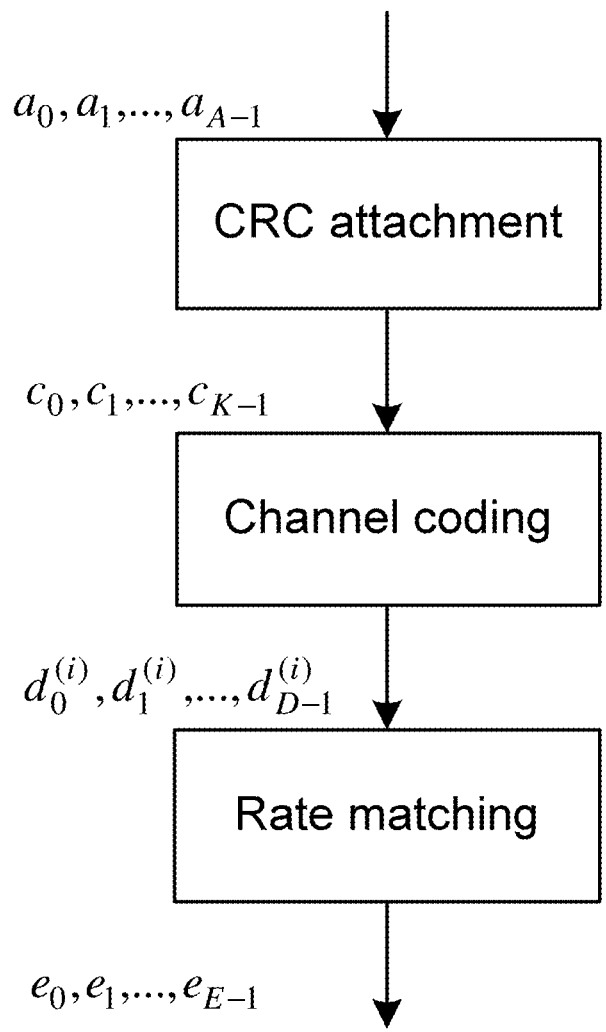
FIG. 13 is a reproduction of FIG. 5.3.3-1 of 3GPP TR 36.212 V13.1.0.

FIG. 5.3.3-1 of 3GPP TR 36.212 V13.1.0, Entitled "Processing for One DCI", is Reproduced as FIG. 13

5.3.3.1 DCI formats

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.3.3.1.1 Format 0

DCI format 0 is used for the scheduling of PUSCH in one UL cell.

The following information is transmitted by means of the DCI format 0:

Carrier indicator 0 or 3 bits. This field is present according to the definitions in [3].

Flag for format0/format1A differentiation 1 bit, where value 0 indicates format 0 and value 1 indicates format 1A Frequency hopping flag—1 bit as defined in section 8.4 of [3]. This field is used as the MSB of the corresponding resource allocation field for resource allocation type 1.

Resource block assignment and hopping resource allocation $-\lceil \log_2 (N_{RB}^{UL}(N_{RB}^{UL}+1)/2) \rceil$ bits For PUSCH hopping (resource allocation type 0 only):
$N_{UL\_hop}$ MSB bits are used to obtain the value of $\tilde{n}_{PRB}(i)$ as indicated in section 8.4 of [3]

$(\lceil \log_2(N_{RB}^{UL}(N_{RB}^{UL}+1)/2) \rceil) - N_{UL\_hop}$ bits provide the resource allocation of the first slot in the UL subframe For non-hopping PUSCH with resource allocation type 0:
$(\lceil \log_2(N_{RB}^{UL}(N_{RB}^{UL}+1)/2) \rceil)$ bits provide the resource allocation in the UL subframe as defined in section 8.1.1 of [3]

For non-hopping PUSCH with resource allocation type 1:
The concatenation of the frequency hopping flag field and the resource block assignment and hopping resource allocation field provides the resource allocation field in the UL subframe as defined in section 8.1.2 of [3]

Modulation and coding scheme and redundancy version—5 bits as defined in section 8.6 of [3]

New data indicator—1 bit

TPC command for scheduled PUSCH—2 bits as defined in section 5.1.1.1 of [3]

Cyclic shift for DM RS and OCC index—3 bits as defined in section 5.5.2.1.1 of [2]

UL index—2 bits as defined in sections 5.1.1.1, 7.2.1, 8 and 8.4 of [3] (this field is present only for TDD operation with uplink-downlink configuration 0)

Downlink Assignment Index (DAI)—2 bits as defined in section 7.3 of [3] (this field is present only for cases with TDD primary cell and either TDD operation with uplink-downlink configurations 1-6 or FDD operation)

CSI request—1, 2 or 3 bits as defined in section 7.2.1 of [3]. The 2-bit field applies to UEs configured with no more than five DL cells and to UEs that are configured with more than one DL cell and when the corresponding DCI format is mapped onto the UE specific search space given by the C-RNTI as defined in [3];

UEs that are configured by higher layers with more than one CSI process and when the corresponding DCI format is mapped onto the UE specific search space given by the C-RNTI as defined in [3];

UEs that are configured with two CSI measurement sets by higher layers with the parameter csi-MeasSubframeSet, and when the corresponding DCI format is mapped onto the UE specific search space given by the C-RNTI as defined in [3];

the 3-bit field applies to UEs that are configured with more than five DL cells and when the corresponding DCI format is mapped onto the UE specific search space given by the C-RNTI as defined in [3];

otherwise the 1-bit field applies

SRS request—0 or 1 bit. This field can only be present in DCI formats scheduling PUSCH which are mapped onto the UE specific search space given by the C-RNTI as defined in [3]. The interpretation of this field is provided in section 8.2 of [3]

Resource allocation type—1 bit. This field is only present if $N_{RB}^{UL} < N_{RB}^{DL}$. The interpretation of this field is provided in section 8.1 of [3]

If the number of information bits in format 0 mapped onto a given search space is less than the payload size of format 1A for scheduling the same serving cell and mapped onto the same search space (including any padding bits appended to format 1A), zeros shall be appended to format 0 until the payload size equals that of format 1A.

[ . . . ]

8 Physical Uplink Shared Channel Related Procedures

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

For a non-BL/CE UE, and for FDD and transmission mode 1, there shall be 8 uplink HARQ processes per serving cell for non-subframe bundling operation, i.e. normal HARQ operation, and 3 uplink HARQ processes for subframe bundling operation when parameter e-HARQ-Pattern-r12 is set to TRUE and 4 uplink HARQ processes for subframe bundling operation otherwise. For a non-BL/CE UE, and for FDD and transmission mode 2, there shall be 16 uplink HARQ processes per serving cell for non-subframe bundling operation and there are two HARQ processes associated with a given subframe as described in [8]. The subframe bundling operation is configured by the parameter ttiBundling provided by higher layers.

For FDD and a BL/CE UE configured with CEModeA, there shall be at most 8 uplink HARQ processes per serving cell.

For FDD and a BL/CE UE configured with CEModeB, there shall be at most 2 uplink HARQ processes per serving cell.

In case higher layers configure the use of subframe bundling for FDD and TDD, the subframe bundling operation is only applied to UL-SCH, such that four consecutive uplink subframes are used.

A BL/CE UE is not expected to be configured with simultaneous PUSCH and PUCCH transmission.

8.0 UE Procedure for Transmitting the Physical Uplink Shared Channel

The term "UL/DL configuration" in this subclause refers to the higher layer parameter subframeAssignment unless specified otherwise.

For FDD and normal HARQ operation, the UE shall upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information.

For FDD-TDD and normal HARQ operation and a PUSCH for serving cell c with frame structure type 1, the UE shall upon detection of a PDCCH/EPDCCH with DCI format 0/4 and/or a PHICH transmission in subframe n intended for the UE, adjust the corresponding PUSCH transmission for serving cell c in subframe n+4 according to the PDCCH/EPDCCH and PHICH information.

For normal HARQ operation, if the UE detects a PHICH transmission and if the most recent PUSCH transmission for the same transport block was using spatial multiplexing according to subclause 8.0.2 and the UE does not detect a PDCCH/EPDCCH with DCI format 4 in subframe n intended for the UE, the UE shall adjust the corresponding PUSCH retransmission in the associated subframe according to the PHICH information, and using the number of transmission layers and precoding matrix according to the most recent PDCCH/EPDCCH, if the number of negatively acknowledged transport blocks is equal to the number of transport blocks indicated in the most recent PDCCH/EPDCCH associated with the corresponding PUSCH.

For normal HARQ operation, if the UE detects a PHICH transmission and if the most recent PUSCH transmission for the same transport block was using spatial multiplexing according to subclause 8.0.2 and the UE does not detect a PDCCH/EPDCCH with DCI format 4 in subframe n intended for the UE, and if the number of negatively acknowledged transport blocks is not equal to the number of transport blocks indicated in the most recent PDCCH/EPDCCH associated with the corresponding PUSCH then the UE shall adjust the corresponding PUSCH retransmission in the associated subframe according to the PHICH information, using the precoding matrix with codebook index 0 and the number of transmission layers equal to number of layers corresponding to the negatively acknowledged transport block from the most recent PDCCH/EPDCCH. In this case, the UL DMRS resources are calculated according to the cyclic shift field for DMRS [3] in the most recent PDCCH/EPDCCH with DCI format 4 associated with the corresponding PUSCH transmission and number of layers corresponding to the negatively acknowledged transport block.

If a UE is configured with the carrier indicator field for a given serving cell, the UE shall use the carrier indicator field value from the detected PDCCH/EPDCCH with uplink DCI format to determine the serving cell for the corresponding PUSCH transmission.

For FDD and normal HARQ operation, if a PDCCH/EPDCCH with CSI request field set to trigger an aperiodic CSI report, as described in subclause 7.2.1, is detected by a UE on subframe n, then on subframe n+4 UCI is mapped on the corresponding PUSCH transmission, when simultaneous PUSCH and PUCCH transmission is not configured for the UE.

[ . . . ]

When a UE is configured with higher layer parameter ttiBundling and configured with higher layer parameter e-HARQ-Pattern-r12 set to FALSE or not configured, for FDD and subframe bundling operation, the UE shall upon detection of a PDCCH/EPDCCH with DCI format 0 in subframe n intended for the UE, and/or a PHICH transmission in subframe n−5 intended for the UE, adjust the corresponding first PUSCH transmission in the bundle in subframe n+4 according to the PDCCH/EPDCCH and PHICH information.

When a UE is configured with higher layer parameter ttiBundling and configured with higher layer parameter e-HARQ-Pattern-r12 set to TRUE, for FDD and subframe bundling operation, the UE shall upon detection of a PDCCH/EPDCCH with DCI format 0 in subframe n intended for the UE, and/or a PHICH transmission in subframe n−1 intended for the UE, adjust the corresponding first PUSCH transmission in the bundle in subframe n+4 according to the PDCCH/EPDCCH and PHICH information.

For both FDD and TDD serving cells, the NDI as signalled on PDCCH/EPDCCH, the RV as determined in subclause 8.6.1, and the TBS as determined in subclause 8.6.2, shall be delivered to higher layers.

For a non-BL/CE UE, for TDD and transmission mode 1, the number of HARQ processes per serving cell shall be determined by the UL/DL configuration (Table 4.2-2 of [3]), as indicated in Table 8-1. For TDD and transmission mode 2, the number of HARQ processes per serving cell for non-subframe bundling operation shall be twice the number determined by the UL/DL configuration (Table 4.2-2 of [3]) as indicated in Table 8-1 and there are two HARQ processes associated with a given subframe as described in [8]. For TDD and both transmission mode 1 and transmission mode 2, the "TDD UL/DL configuration" in Table 8-1 refers to the UL-reference UL/DL configuration for the serving cell if UL-reference UL/DL configuration is defined for the serving cell and refers to the serving cell UL/DL configuration otherwise.

For a BL/CE UE configured with CEModeA and for TDD, the maximum number of HARQ processes per serving cell shall be determined by the UL/DL configuration (Table 4.2-2 of [3]) according to the normal HARQ operation in Table 8-1. For TDD a BL/CE UE configured with CEModeB is not expected to support more than 2 uplink HARQ processes per serving cell.

Table 8-1 of 3GPP TR 36.213 V13.1.1, Entitled "Number of Synchronous UL HARQ Processes for TDD", is Reproduced as FIG. 14

[ . . . ]

A UE is semi-statically configured via higher layer signalling to transmit PUSCH transmissions signalled via PDCCH/EPDCCH according to one of two uplink transmission modes, denoted mode 1-2.

If a UE is configured by higher layers to decode PDCCHs with the CRC scrambled by the C-RNTI, the UE shall decode the PDCCH according to the combination defined in Table 8-3 and transmit the corresponding PUSCH. The scrambling initialization of this PUSCH corresponding to these PDCCHs and the PUSCH retransmission for the same transport block is by C-RNTI.

If a UE is configured by higher layers to decode EPDCCHs with the CRC scrambled by the C-RNTI, the UE shall decode the EPDCCH according to the combination defined in Table 8-3A and transmit the corresponding PUSCH. The scrambling initialization of this PUSCH corresponding to these EPDCCHs and the PUSCH retransmission for the same transport block is by C-RNTI.

If a UE is configured by higher layers to decode MPDCCHs with the CRC scrambled by the C-RNTI, the UE shall decode the MPDCCH according to the combination defined in Table 8-3B and transmit the corresponding PUSCH. The scrambling initialization of this PUSCH corresponding to these MPDCCHs and the PUSCH retransmission for the same transport block is by C-RNTI.

Transmission mode 1 is the default uplink transmission mode for a UE until the UE is assigned an uplink transmission mode by higher layer signalling.

When a UE configured in transmission mode 2 receives a DCI Format 0 uplink scheduling grant, it shall assume that the PUSCH transmission is associated with transport block 1 and that transport block 2 is disabled.

Table 8-3 of 3GPP TR 36.213 V13.1.1, Entitled "PDCCH and PUSCH Configured by C-RNTI", is Reproduced as FIG. 15

[ . . . ]

If a UE is configured by higher layers to decode PDCCHs with the CRC scrambled by the C-RNTI and is also configured to receive random access procedures initiated by "PDCCH orders", the UE shall decode the PDCCH according to the combination defined in Table 8-4.

If a UE is configured by higher layers to decode EPDCCHs with the CRC scrambled by the C-RNTI and is also configured to receive random access procedures initiated by "PDCCH orders", the UE shall decode the EPDCCH according to the combination defined in Table 8-4A.

If a UE is configured by higher layers to decode MPDCCHs with the CRC scrambled by the C-RNTI and is also configured to receive random access procedures initiated by "PDCCH orders", the UE shall decode the MPDCCH according to the combination defined in Table 8-4B.

Table 8-4 of 3GPP TR 36.213 V13.1.1, Entitled "PDCCH Configured as 'PDCCH Order' to Initiate Random Access Procedure", is Reproduced as FIG. 16

[ . . . ]

If a UE is configured by higher layers to decode PDCCHs with the CRC scrambled by the SPS C-RNTI, the UE shall decode the PDCCH according to the combination defined in Table 8-5 and transmit the corresponding PUSCH.

The scrambling initialization of this PUSCH corresponding to these PDCCHs and PUSCH retransmission for the same transport block is by SPS C-RNTI. The scrambling initialization of initial transmission of this PUSCH without a corresponding PDCCH and the PUSCH retransmission for the same transport block is by SPS C-RNTI.

If a UE is configured by higher layers to decode EPDCCHs with the CRC scrambled by the SPS C-RNTI, the UE shall decode the EPDCCH according to the combination defined in Table 8-5A and transmit the corresponding PUSCH.

The scrambling initialization of this PUSCH corresponding to these EPDCCHs and PUSCH retransmission for the same transport block is by SPS C-RNTI. The scrambling initialization of initial transmission of this PUSCH without a corresponding EPDCCH and the PUSCH retransmission for the same transport block is by SPS C-RNTI.

If a UE is configured by higher layers to decode MPDCCHs with the CRC scrambled by the SPS C-RNTI, the UE shall decode the MPDCCH according to the combination defined in Table 8-5B and transmit the corresponding PUSCH.

The scrambling initialization of this PUSCH corresponding to these MPDCCHs and PUSCH retransmission for the same transport block is by SPS C-RNTI. The scrambling initialization of initial transmission of this PUSCH without a corresponding MPDCCH and the PUSCH retransmission for the same transport block is by SPS C-RNTI.

[ . . . ]

If a UE is configured by higher layers to decode PDCCHs with the CRC scrambled by the Temporary C-RNTI regardless of whether UE is configured or not configured to decode PDCCHs with the CRC scrambled by the C-RNTI, the UE shall decode the PDCCH according to the combination defined in Table 8-6 and transmit the corresponding PUSCH. The scrambling initialization of PUSCH corresponding to these PDCCH is by Temporary C-RNTI.

[ . . . ]

8.1 Resource Allocation for PDCCH/EPDCCH with Uplink DCI Format

Two resource allocation schemes Type 0 and Type 1 are supported for PDCCH/EPDCCH with uplink DCI format.

Resource allocation scheme Type 0 or Type 2 are supported for MPDCCH with uplink DCI format.

If the resource allocation type bit is not present in the uplink DCI format, only resource allocation type 0 is supported.

If the resource allocation type bit is present in the uplink DCI format, the selected resource allocation type for a decoded PDCCH/EPDCCH is indicated by a resource allocation type bit where type 0 is indicated by 0 value and type 1 is indicated otherwise. The UE shall interpret the resource allocation field depending on the resource allocation type bit in the PDCCH/EPDCCH with uplink DCI format detected.

8.1.1 Uplink Resource Allocation Type 0

The resource allocation information for uplink resource allocation type 0 indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). For a BL/CE UE, uplink resource allocation type 0 is only applicable for UE configured with CEModeA and $N_{RB}^{UL}=6$ in this subclause. The resource indication value is defined by if $(L_{CRBs}-1) \leq \lfloor N_{RB}^{UL}/2 \rfloor$ then $$RIV = N_{RB}^{UL}(L_{CRBs}-1) + RB_{START}$$

else $$RIV = N_{RB}^{UL}(N_{RB}^{UL} - L_{CRBs} + 1) + (N_{RB}^{UL} - 1 - RB_{START})$$

8.1.2 Uplink Resource Allocation Type 1

The resource allocation information for uplink resource allocation type 1 indicates to a scheduled UE two sets of resource blocks with each set including one or more consecutive resource block groups of size P as given in table 7.1.6.1-1 assuming $N_{RB}^{UL}$ as the system bandwidth. A combinatorial index r consists of $$\left\lceil \log_2 \left( \binom{\lceil N_{RB}^{UL}/P + 1 \rceil}{4} \right) \right\rceil$$

bits. The bits from the resource allocation field in the scheduling grant represent r unless the number of bits in the resource allocation field in the scheduling grant is smaller than required to fully represent r, in which case the bits in the resource allocation field in the scheduling grant occupy the LSBs of r and the value of the remaining bits of r shall be assumed to be 0; or larger than required to fully represent r, in which case r occupies the LSBs of the resource allocation field in the scheduling grant.

The combinatorial index r corresponds to a starting and ending RBG index of resource block set 1, $s_0$ and $s_1-1$, and resource block set 2, $s_2$ and $s_3-1$ respectively, where r is given by equation $$r = \sum_{i=0}^{M-1} \binom{N - s_i}{M - i}$$

defined in subclause 7.2.1 with M=4 and N=$\lceil N_{RB}^{UL}/P \rceil +1$. subclause 7.2.1 also defines ordering properties and range of values that $s_i$ (RBG indices) map to. Only a single RBG is allocated for a set at the starting RBG index if the corresponding ending RBG index equals the starting RBG index.

8.1.3 Uplink Resource Allocation Type 2

Uplink resource allocation type 2 is only applicable for BL/CE UE configured with CEModeB. The resource allocation information for uplink resource allocation type 2 indicates to a scheduled UE a set of contiguously allocated resource blocks within a narrowband as given in Table 8.1.3-1

Table 8.1.3-1 of 3GPP TR 36.213 V13.1.1, Entitled "Resource Block(s) Allocation for BL/CE UE Configured with CEModeB", is Reproduced as FIG. 17

[ . . . ]

9.1 UE Procedure for Determining Physical Downlink Control Channel Assignment 9.1.1 PDCCH Assignment Procedure The control region of each serving cell consists of a set of CCEs, numbered from 0 to $N_{CCE,k}-1$ according to subclause 6.8.1 in [3], where $N_{CCE,k}$ is the total number of CCEs in the control region of subframe k.

The UE shall monitor a set of PDCCH candidates on one or more activated serving cells as configured by higher layer signalling for control information, where monitoring implies attempting to decode each of the PDCCHs in the set according to all the monitored DCI formats.

A BL/CE UE is not required to monitor PDCCH.

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L\{(Y_k + m') \bmod \lfloor N_{CCE,k}/L \rfloor\} + i$$

where $Y_k$ is defined below, i=0, L, L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, L, $M^{(L)}-1$. $M^{(L)}$ is the number of PDCCH candidates to monitor in the given search space.

If a UE is configured with higher layer parameter cif-InSchedulingCell-r13, the carrier indicator field value corresponds to cif-InSchedulingCell-r13, otherwise, the carrier indicator field value is the same as ServCellIndex given in [11].

The UE shall monitor one common search space in every non-DRX subframe at each of the aggregation levels 4 and 8 on the primary cell.

A UE shall monitor common search space on a cell to decode the PDCCHs necessary to receive MBMS on that cell when configured by higher layers.

If a UE is not configured for EPDCCH monitoring, and if the UE is not configured with a carrier indicator field, then the UE shall monitor one PDCCH UE-specific search space at each of the aggregation levels 1, 2, 4, 8 on each activated serving cell in every non-DRX subframe.

If a UE is not configured for EPDCCH monitoring, and if the UE is configured with a carrier indicator field, then the UE shall monitor one or more UE-specific search spaces at each of the aggregation levels 1, 2, 4, 8 on one or more activated serving cells as configured by higher layer signalling in every non-DRX subframe.

If a UE is configured for EPDCCH monitoring on a serving cell, and if that serving cell is activated, and if the UE is not configured with a carrier indicator field, then the UE shall monitor one PDCCH UE-specific search space at each of the aggregation levels 1, 2, 4, 8 on that serving cell in all non-DRX subframes where EPDCCH is not monitored on that serving cell.

If a UE is configured for EPDCCH monitoring on a serving cell, and if that serving cell is activated, and if the UE is configured with a carrier indicator field, then the UE shall monitor one or more PDCCH UE-specific search spaces at each of the aggregation levels 1, 2, 4, 8 on that serving cell as configured by higher layer signalling in all non-DRX subframes where EPDCCH is not monitored on that serving cell.

The common and PDCCH UE-specific search spaces on the primary cell may overlap.

A UE configured with the carrier indicator field associated with monitoring PDCCH on serving cell c shall monitor PDCCH configured with carrier indicator field and with CRC scrambled by C-RNTI in the PDCCH UE specific search space of serving cell c.

A UE configured with the carrier indicator field associated with monitoring PDCCH on the primary cell shall monitor PDCCH configured with carrier indicator field and with CRC scrambled by SPS C-RNTI in the PDCCH UE specific search space of the primary cell.

The UE shall monitor the common search space for PDCCH without carrier indicator field.

For the serving cell on which PDCCH is monitored, if the UE is not configured with a carrier indicator field, it shall monitor the PDCCH UE specific search space for PDCCH without carrier indicator field, if the UE is configured with a carrier indicator field it shall monitor the PDCCH UE specific search space for PDCCH with carrier indicator field.

If the UE is not configured with a LAA Scell, the UE is not expected to monitor the PDCCH of a secondary cell if it is configured to monitor PDCCH with carrier indicator field corresponding to that secondary cell in another serving cell.

If the UE is configured with a LAA Scell, the UE is not expected to monitor the PDCCH UE specific space of the LAA SCell if it is configured to monitor PDCCH with carrier indicator field corresponding to that LAA Scell in another serving cell,
  where the UE is not expected to be configured to monitor PDCCH with carrier indicator field in an LAA Scell;
  where the UE is not expected to be scheduled with PDSCH starting in the second slot in a subframe in an LAA Scell if the UE is configured to monitor PDCCH with carrier indicator field corresponding to that LAA Scell in another serving cell.

For the serving cell on which PDCCH is monitored, the UE shall monitor PDCCH candidates at least for the same serving cell.

A UE configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in [4] in the
  common search space
  PDCCH UE specific search space
on the primary cell shall assume that for the PDCCH candidates with CRC scrambled by C-RNTI or SPS C-RNTI,
  if the UE is configured with the carrier indicator field associated with monitoring the PDCCH on the primary cell, only the PDCCH in the common search space is transmitted by the primary cell;
  otherwise, only the PDCCH in the UE specific search space is transmitted by the primary cell.

A UE configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size may be transmitted in the given serving cell in any PDCCH UE specific search space corresponding to any of the possible values of CIF for the given DCI format size.

If a serving cell is a LAA Scell, and if the higher layer parameter subframeStartPosition for the Scell indicates 's07',
  The UE monitors PDCCH UE-specific search space candidates on the Scell in both the first and second slots of a subframe, and the aggregation levels defining the search spaces are listed in Table 9.1.1-1A;
otherwise,
  The aggregation levels defining the search spaces are listed in Table 9.1.1-1.

If a serving cell is a LAA Scell, the UE may receive PDCCH with DCI CRC scrambled by CC-RNTI as described in subclause 13A on the LAA Scell.

The DCI formats that the UE shall monitor depend on the configured transmission mode per each serving cell as defined in subclause 7.1.

If a UE is configured with higher layer parameter skipMonitoringDCI-format0-1A for a serving cell, the UE is not required to monitor the PDCCH with DCI Format 0/1A in the UE specific search space for that serving cell.

If a UE is configured with higher layer parameter pdcch-candidateReductions for a UE specific search space at aggregation level L for a serving cell, the corresponding number of PDCCH candidates is given by $M^{(L)}=\text{round}(a \times M_{full}^{(L)})$, where the value of a is determined according to Table 9.1.1-2 and $M_{full}^{(L)}$ is determined according to Table 9.1.1-1 by replacing $M^{(L)}$ with $M_{full}^{(L)}$.

Table 9.1.1-1 of 3GPP TR 36.213 V13.1.1, Entitled "PDCCH Candidates Monitored by a UE", is Reproduced as FIG. 18

Table 9.1.1-1A of 3GPP TR 36.213 V13.1.1, Entitled "PDCCH UE-Specific Search Space Candidates Monitored by a UE on LAA Scell", is Reproduced as FIG. 19

Table 9.1.1-2 of 3GPP TR 36.213 V13.1.1, Entitled "Scaling Factor for PDCCH Candidates Reduction", is Reproduced as FIG. 20

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, A=39827, D=65537 and $k = \lfloor n_s/2 \rfloor$, $n_s$ is the slot number within a radio frame.

The RNTI value used for $n_{RNTI}$ is defined in subclause 7.1 in downlink and subclause 8 in uplink.

When it comes to NR, the story becomes somehow different, as backward compatibility is not a must. Numerology can be adjusted so that reducing symbol number of a TTI would not be the only tool to change TTI length. Using LTE numerology as an example, it comprises 14 OFDM symbol in 1 ms and a subcarrier spacing of 15 KHz. When the subcarrier spacing goes to 30 KHz, under the assumption of same FFT size and same CP structure, there would be 28 OFDM symbols in 1 ms, equivalently the TTI become 0.5 ms if the number of OFDM symbol in a TTI is kept the same. This implies the design between different TTI lengths can be kept common, with good scalability performed on the subcarrier spacing. Of course, there would always be trade-off for the subcarrier spacing selection, e.g., FFT size, definition/number of PRB, the design of CP, supportable system bandwidth, . . . . While as NR considers larger system bandwidth, and larger coherence bandwidth, inclusion of a larger sub carrier spacing is a nature choice.

As discussed above, it is generally difficult to fulfill all diverse requirements with a single numerology. Therefore, it is agreed in the very first meeting that more than one numerology would be adopted. And considering the standardization effort, implementation efforts, as well as multiplexing capability among different numerologies, it would be beneficial to have some relationship between different numerologies, such as integral multiple relationship. Several numerology families, were raised, one of them is based on LTE 15 KHz, and some other numerologies (Alt2~4 below) which allows power N of 2 symbols in 1 ms:

For NR, it is necessary to support more than one values of subcarrier-spacing
Values of subcarrier-spacing are derived from a particular value of subcarrier-spacing multiplied by N where N is an integer
Alt.1: Subcarrier-spacing values include 15 kHz subcarrier-spacing (i.e., LTE based numerology)
Alt.2: Subcarrier-spacing values include 17.5 kHz subcarrier-spacing with uniform symbol duration including CP length
Alt.3: Subcarrier-spacing values include 17.06 kHz subcarrier-spacing with uniform symbol duration including CP length
Alt.4: Subcarrier-spacing values 21.33 kHz
Note: other alternatives are not precluded
FFS: exact value of a particular value and possible values of N
The values of possible subcarrier-spacing will be further narrowed-down in RAN1#85

Also, whether there would be restriction on the multiplier of a given numerology family is also discussed, power of 2 (Alt 1 below) drew some interests as it can multiplex different numerology easier without introducing much overhead when different numerologies is multiplexed in time domain:

RAN1 will continue further study and conclude between following alternatives in the next meeting
Alt. 1:
The subcarrier spacing for the NR scalable numerology should scale as $f_{sc}=f_0*2^m$ where
$f_0$ is FFS
m is an integer chosen from a set of possible values
Alt. 2:
The subcarrier spacing for the NR scalable numerology should scale as $f_{sc}=f_0*M$ where
$f_0$ is FFS
M is an integer chosen from a set of possible positive values Usually, RAN1 works as band agnostic manner, i.e. a scheme/feature would be assumed to be applicable for all frequency bands and in the following RAN4 would derive relevant test case considering if some combination is unrealistic or deployment can be done reasonably. This rule would still be assumed in NR, while some companies do see there would be restriction for sure as the frequency range of NR is quite high:

For the study of NR, RAN1 assumes that multiple (but not necessarily all) OFDM numerologies can apply to the same frequency range
Note: RAN1 does not assume to apply very low value of subcarrier spacing to very high carrier frequency URLLC (Ultra-Reliable and Low Latency Communication) is a service type that has a very tight timing requirement, comparing with most of regular traffic, e.g., eMBB (Enhanced Mobile Broadband) service. To fulfill the latency requirement, the transmission interval/scheduling interval would need to be short. One way to shorten the transmission interval/scheduling interval is to increase the subcarrier spacing so as to reduce the OFDM symbol length in the time domain. For example, when subcarrier spacing is 15 KHz, 7 OFDM symbols transmission interval would occupy 0.5 ms while when subcarrier spacing is 60 KHz, 7OFDDM symbols transmission interval would occupy 0.125 ms, which can fulfil the stringent timing requirement easier.

Another way is to reduce the number of OFDM symbols within a transmission interval. For example, if the subcarrier spacing is kept as 15 kHz, when the number of OFDM symbol within a transmission interval is reduced from 14 to 2, the transmission time interval would be changed from 1 ms to about 0.14 ms, which result in similar effect of reducing subcarrier spacing.

The two ways of course can be used jointly. On the other hand, eMBB service might also use a reduced transmission interval while not necessarily always to do so as it would come with some potential side effect, e.g., larger control signaling overhead per amount of data traffic, shorter or more frequent control channel reception interval (may increase power consumption), shorter processing time (more complexity). Therefore, it is expected the communication system would be operated with different transmission intervals for different services or UEs. And multiplexing different transmission time interval within a system would be a challenge. There are some ongoing discussions on this aspect from RAN1 #86bis Chairman's Note as follows:

Agreements:
From network perspective, multiplexing of transmissions with different latency and/or reliability requirements for eMBB/URLLC in DL is supported by
Using the same sub-carrier spacing with the same CP overhead
FFS: different CP overhead
Using different sub-carrier spacing
FFS: CP overhead
NR supports both approaches by specification
NR should support dynamic resource sharing between different latency and/or reliability requirements for eMBB/URLLC in DL Also, RAN1 #86bis Chairman's Note and RAN1 #87 Chairman's Note describe how to define transmission interval as scheduling unit, such as slot or min-slot (shortened version of slot) with y is the number of OFDM symbol within a slot, as follows:

Agreements:
For SCS of up to 60 kHz with NCP, y=7 and 14
FFS: whether/which to down select for certain SCS(s)
For SCS of higher than 60 kHz with NCP, y=14
[ . . . ]
Agreements:
NR-PDCCH monitoring at least for single-stage DCI design, NR supports the following minimum granularity of the DCI monitoring occasion:
  For slots: once per slot
  When mini-slots are used: FFS if every symbol or every second symbol
    FFS with respect to which numerology if slot and mini-slot have different numerology (e.g. SCS, CP overhead)
    Note: slot/mini-slot alignment is not assumed here
    Note: This may not apply in all cases
[ . . . ]
Agreements:
  Mini-slots have the following lengths
    At least above 6 GHz, mini-slot with length 1 symbol supported
      FFS below 6 GHz including unlicensed band
      FFS for URLLC use case regardless frequency band
    FFS whether DL control can be supported within one mini-slot of length 1
    Lengths from 2 to slot length −1
      FFS on restrictions of mini-slot length based on restrictions on starting position
      For URLLC, 2 is supported, FFS other values
    Note: Some UEs targeting certain use cases may not support all mini-slot lengths and all starting positions
    Can start at any OFDM symbol, at least above 6 GHz
      FFS below 6 GHz including unlicensed band
      FFS for URLLC use case regardless frequency band
    A mini-slot contains DMRS at position(s) relative to the start of the mini-slot Also, control channel in NR (e.g., NR-PDCCH) needs to be designed for adapting different services requirements/scenarios. When to monitor the occasion and number of symbols use to carry the corresponding data would be varying for different services. The composition of a slot may also be different, e.g., which portion of a slot would be DL or which portion of a slot would be uplink could depends on traffic property. For example, pure downlink slot, pure uplink slot, or a slot with DL portion and uplink portion (associated with potential gap portion considering processing or timing advance for direction change) could be a minimum set of slot structure to be considered. It is further considered to use a group common control channel to indicate slot structure as follows:

Agreements:
  NR supports a 'group common PDCCH' carrying information of e.g. the slot structure.
    If the UE does not receive the 'group common PDCCH' the UE should be able to receive at least PDCCH in a slot, at least if the gNB did not transmit the 'group common PDCCH'.
    The network will inform through RRC signalling the UE whether to decode the 'group common PDCCH' or not
    Common does not necessarily imply common per cell.
    Continue the discussion on the detailed content of the 'group common PDCCH' including usage for TDD and FDD
    The term 'group common PDCCH' refers to a channel (either a PDCCH or a separately designed channel) that carries information intended for the group of UEs.
Agreements:
  The staring position of downlink data in a slot can be explicitly and dynamically indicated to the UE.
    FFS: signaled in the UE-specific DCI and/or a 'group-common PDCCH'
    FFS: how and with what granularity the unused control resource set(s) can be used for data
Agreements:
  The UE will have the possibility to determine whether some blind decodings can be skipped based on information on a 'group common PDCCH' (if present).
    FFS: if the data starting position is signaled on the group common PDCCH, the UE may exploit this information to skip some blind decodings
    FFS: if the end of the control resource set is signaled on the 'group common PDCCH', the UE may exploit this information to skip some blind decodings
    FFS: how to handle the case when there is no 'group common PDCCH' in a slot
  When monitoring for a PDCCH, the UE should be able to process a detected PDCCH irrespective of whether the 'group common PDCCH' is received or not
Agreements:
  'Slot format related information'
    Information from which the UE can derive at least which symbols in a slot that are 'DL', 'UL' (for Rel-15), and 'other', respectively
    FFS: if 'other' can be subdivided into 'blank', 'sidelink', etc
  FFS: 'Control resource set duration'
    FFS: Indicates the duration of the control resource set(s)
    FFS: Can help the UE skip some of the semi-statically configured blind decodings. If not received, the UE performs all blind decodings.

The content of group common PDCCH and how to reveal the slot structure information is unclear. One key factor is how to group the UE. One example of grouping is to group UE with similar service requirements (e.g., the same numerology, the same RTT or timing relationship), or the same length of data duration (e.g., the same length of mini-slot). If the property of UE grouped together is more similar, the slot structure is more regular and the information amount related to slot structure could be less.

For example, if all UE has a same mini slot length, the number of mini-slot with in a slot could be known by dividing the slot length with a mini-slot length, so as to allow UE realize which symbol is DL or UL or which symbol is control or data. Taking 2 symbol mini slots as an example. If the number of symbol can be used to carry mini slot is 12 and UE is indicated a mini-slot length of 2 symbols, the UE knows that symbols 0, 2, 4, 6, 8, and 10 may contain control information which requires PDCCH monitoring, while 1, 3, 5, 7, 9, and 11 do not contain control information which does not require PDCCH monitoring. Note that in the example, mini slots include the symbol for control information, while even if mini slot does not include control channel, similar situation can be observed.

Another example is the number of DL symbol or UL symbol. For example, if all UEs in a group has a same ratio of DL symbol and UL symbol (e.g., after every 3 DL symbols there is one UL symbol), the UE may know that symbols 1, 2, 3, 5, 6, 7, 9, 10, and 11 are downlink symbols and symbols 4, 8, and 12 are uplink symbols, if a ratio (or the total number of symbols as well) are indicated in the group common PDCCH for the UEs. (Note that potential gap symbols are not considered in the above example, while similar situation can be observed if gap symbol exist.). The above example can be considered as "regular" slot structure.

On the other hand, if the slot structure is not regular (e.g., some UE(s) may use 2 symbol mini slots while some other UE(s) may use 5 symbol mini-slots), more detailed information is required for UE to know which symbol is control/data, and which symbol is UL/DL comparing with knowing the structure with one or a few factor(s) for regular structure case. A worst case could be using a bitmap for indicating the slot structure revealing the role (DL or UL control, or data) of each symbol which could be a quite significant overhead.

It is observed that if the structure is more regular, the overhead of each group common PDCCH can be reduced, while the number of group common PDCCH would increase as the number of group increase accordingly (UEs in a group have to be quite similar). On the other hand, if the structure is more irregular, the overhead of each group common PDCCH would be increased, while he number of group common PDCCH is reduced as the number of group is reduced (UEs in a group don't have to be that similar). Which direction leads to less overall control signaling overhead may depend on situation, so that proper tradeoff/adaptation between two sides may need to be considered.

A first concept of this invention is, in general, the UEs can be indicated with two modes to realize the slot structure. One mode leads to regular slot structure where the slot structure comprises several minimum function blocks. The minimum function blocks are identical from at least from the UE side in a same slot. Identical from UE side means every X symbol UE would expect a symbol with a same functionality (e.g., UL or DL control or data). More specifically, group common PDCCH may indicate the value of X, and/or information to allow UE deriving X, and/or information to allow UE the functionality of each symbol within minimum function blocks (symbol 1~symbol X). Another mode leads to allowing irregular slot structure where the slot structure can be known on a per symbol basis, e.g., using a bit map to indicate the functionality of each symbol where a least one bit corresponding to one symbol within a slot.

A second concept is generally a base station groups UE(s) with different properties in a group common PDCCH while different UEs expect a regular structure with different minimum function blocks. The UEs receiving group common PDCCH may interpret or determine the slot structure with different minimum function blocks according to some pre-configurations. Furthermore, the difference of deriving the slot configuration may suffer from some constraint. One example of the difference is a length of the minimum function block of a first UE is an integer multiple of a length of the minimum function block of a second UE. For example, the first UE may expect every 2*X symbol there is a symbol with a same functionality. On the other hand, the second UE may expect every X symbol there is a symbol with a same functionality.

Another example of the difference is that different UEs have a same length of minimum function block while have different understanding regarding functionality of each symbol within a minimum function block. For example, a first UE expects the first symbol of every X symbol containing control information (e.g., not other symbols) and a second UE expects the first two symbols of every X symbol containing control information (e.g., not other symbols).

In one embodiment, a UE is informed/configured a mode for determine a slot structure according to a group common PDCCH by a base station. Preferably, there are two modes for determining slot structure for a slot according to a group common PDCCH associated with the slot.

A first mode could be a regular slot structure mode in which UE determines the same functionality for an OFDM symbol every X OFDM symbol (e.g., 1, 5, and 9 would have a same functionality if X=4). In one embodiment, the functionality comprises all or some or combinations of DL, UL, data, control symbol. In the first mode, the baste station could indicate the length of minimum function block in a group common PDCCH. The functionality could comprise all or some or combinations of DL, UL, data, control symbol.

In one embodiment in the first mode, the baste station would indicate the length of minimum function block in a pre-configuration or RRC (Radio Resource Control) message. The base station could indicate the functionalities of each symbol within a minimum function block in a group common PDCCH. The baste station could also indicate the functionalities of each symbol within a minimum function block in a pre-configuration or RRC message.

A second mode could be an irregular slot structure mode in which UE cannot derive the slot structure with one minimum function block. In one embodiment in the second mode, the UE could be configured with more than one minimum function blocks. The UE could be informed which minimum function block is included in which portion of a slot via a group common DCI associated with the slot. The UE could also be informed of a presence and/or a sequence of configured minimum function blocks.

The UE can be configured with certain restriction for transmission or reception for the minimum function block by a base station. For example, the restriction could be the UE would receive or transmit for one type of minimum function block while skip a second type of minimum function block in a slot. In one embodiment, the type of minimum function block could be characterized by a length of minimum function block. The type of minimum function block could also be characterized by the composition of the minimum function block, such as functionality of each symbol in the minimum function block.

In one embodiment in the second mode, the UE could be provided with functionality of each symbol in a slot via a group common PDCCH associated with the slot by a base station. The UE could be configured with certain restriction to skip some portion of a slot by the base station, e.g., if the DL portion is too short/too long according to the bitmap.

In another embodiment, a base station could configure UE with different type of minimum function blocks to receive a same group common PDCCH. In one embodiment, a UE could be configured with a type of minimum function block, and interprets or determines the slot structure of a slot according to the configured minimum function block type as well as the group common PDCCH associated with the slot. In one embodiment, the type of minimum function block could be characterized by a length of minimum function block. More specifically, the UEs receiving a same group common PDCCH would have different lengths of minimum function block, while one length among the different lengths is an integer multiple of length among the different lengths. In one embodiment, the type of minimum function block could be characterized by the composition of the minimum function block, such as functionality of each symbol in the minimum function block. More specifically, the UEs receiving a same group common PDCCH would have the same length of minimum function block.

With a correct understanding of slot structure, the UE could receive or transmit each symbol accordingly, e.g., for control or data reception or transmission.

Figure 21:
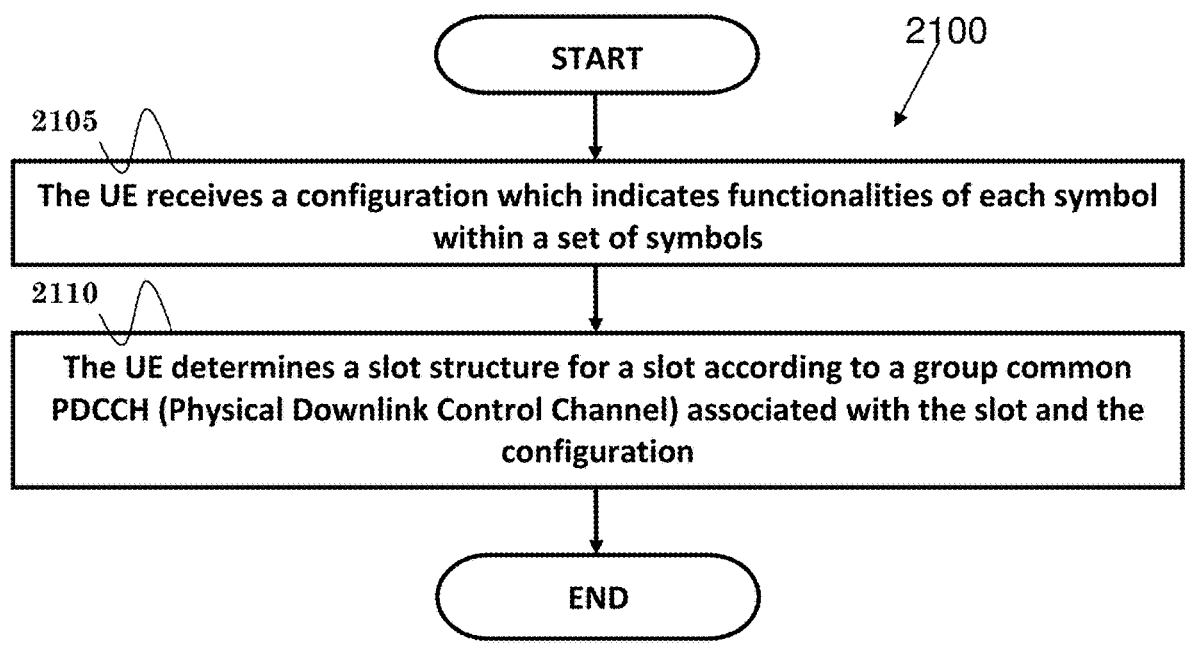
FIG. 21 is a flow chart according to one exemplary embodiment.

FIG. 21 is a flow chart 2100 according to one exemplary embodiment from the perspective of a UE. In step 2105, the UE receives a configuration which indicates functionalities of each symbol within a set of symbols. In step 2110, the UE determines a slot structure for a slot according to a group common PDCCH associated with the slot and the configuration.

In one embodiment, the UE cannot derive a slot format according to the group common PDCCH without the configuration.

In one embodiment, the configuration could be signaled by a RRC (Radio Resource Control) message, and could be specifically for the UE. Furthermore, the configuration could indicate different functionalities of each symbol within different sets of symbols. The UE could receive information regarding which configured set of symbols is present.

In one embodiment, the set of symbols could be a basic unit for a group common PDCCH to provide information.

Referring back to FIGS. 3 and 4, in one exemplary embodiment of a UE, the device 300 includes a program code 312 stored in the memory 310. The CPU 308 could execute program code 312 to enable the UE (i) to receive a configuration which indicates functionalities of each symbol within a set of symbols, and (ii) to determine a slot structure for a slot according to a group common PDCCH associated with the slot and the configuration. Furthermore, the CPU 308 can execute the program code 312 to perform all of the above-described actions and steps or others described herein.

Figure 22:
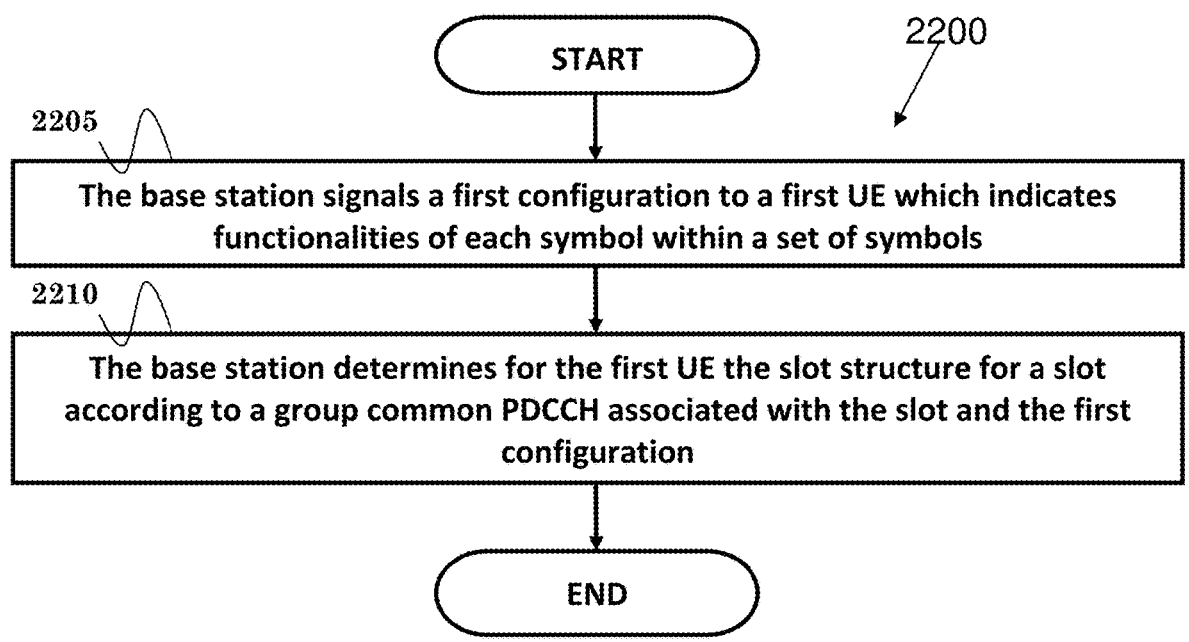
FIG. 22 is a flow chart according to one exemplary embodiment.

FIG. 22 is a flow chart 2200 according to one exemplary embodiment from the perspective of a base station. In step 2205, the base station signals a first configuration to a first UE which indicates functionalities of each symbol within a set of symbols. In step 2210, the base station determines for the first UE the slot structure for a slot according to a group common PDCCH associated with the slot and the first configuration.

In one embodiment, the base station could signal a second configuration to a second UE which indicates functionalities of each symbol within a set of symbols. The base station could determine for the second UE the slot structure for the slot according to the group common PDCCH associated with the slot and the second configuration. The base station could configure the first UE and the second UE to receive a same group common PDCCH. In one embodiment, the first UE and the second UE could have different understandings regarding slot structure of a same slot according to the same group common PDCCH.

In one embodiment, the base station could configure the UE (e.g., the first UE and/or the second UE) different functionalities of each symbol within different set of symbols. The base station could also inform the UE which configured set of symbols is present.

Referring back to FIGS. 3 and 4, in one exemplary embodiment of a base station, the device 300 includes a program code 312 stored in the memory 310. The CPU 308 could execute program code 312 to enable the base station (i) to signal a first configuration to a first UE which indicates functionalities of each symbol within a set of symbols, and (ii) to determine for the first UE the slot structure for a slot according to a group common PDCCH associated with the slot and the first configuration. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
   the UE receives a configuration which indicates one or more functionalities of each symbol within a plurality of minimum function blocks;
   the UE receives a group common PDCCH (Physical Downlink Control Channel) associated with a slot,
   wherein the group common PDCCH indicates:
      a presence of the plurality of minimum function blocks; and
      a sequence of the plurality of minimum function blocks; and
   the UE determines a slot structure for the slot according to:
      the one or more functionalities, of each symbol within the plurality of minimum function blocks, indicated by the configuration; and
      the sequence of the plurality of minimum function blocks indicated by the group common PDCCH,
   wherein the configuration is transmitted by an RRC (Radio Resource Control) message.

2. The method of claim 1, wherein the UE cannot derive a slot format according to the group common PDCCH without the configuration.

3. The method of claim 1, wherein the configuration is specifically for the UE.

4. The method of claim 1, wherein the UE receives information regarding which configured set of symbols is present.

5. The method of claim 1, wherein a set of symbols is a basic unit for the group common PDCCH to provide information.

6. A method of a base station, comprising:
   the base station signals a first configuration to a first UE (User Equipment) which indicates one or more functionalities of each symbol within plurality of minimum function blocks,
   wherein a group common PDCCH (Physical Downlink Control Channel) associated with a slot indicates:
      a presence of the plurality of minimum function blocks; and
      a sequence of the plurality of minimum function blocks; and
   the base station determines for the first UE a slot structure for the slot according to;
      the one or more functionalities, of each symbol within the plurality of minimum function blocks, indicated by the first configuration; and
      the sequence of the plurality of minimum function blocks indicated by the group common PDCCH,
   wherein the first configuration is transmitted by an RRC (Radio Resource Contrail) message.

7. The method of claim 6, wherein: the base station signals a second configuration to a second UE which indicates one or more functionalities of each symbol within a set of symbols, and
   the base station determines for the second UE the slot structure for the slot according to the group common PDCCH associated with the slot and the second configuration.

8. The method of claim 7, wherein the base station configures the first UE and the second UE to receive a same group common PDCCH.

9. The method of claim 8, wherein the first UE and the second UE have different understandings regarding slot structure of a same slot according to the same group common PDCCH.

10. The method of claim 6, wherein the base station informs the first UE which configured set of symbols is present.

11. A User Equipment (UE), comprising:
   a control circuit;
   a processor installed in the control circuit; and
   a memory installed in the control circuit and operatively coupled to the processor; wherein the processor is configured to execute a program code stored in the memory to:
      receive a configuration which indicates one or more functionalities of each symbol within a plurality of minimum function blocks;
      receive a group common PDCCH (Physical Downlink Control Channel) associated with a slot,
      wherein the group common PDCCH indicates:
         a presence of the plurality of minimum function blocks; and
         a sequence of the plurality of minimum function blocks; and
      determine a slot structure for the slot according to:
         the one or more functionalities, of each symbol within the plurality of minimum function blocks, indicated by the configuration; and
         the sequence of the plurality of minimum function blocks indicated by the group common PDCCH, wherein the configuration is transmitted by an RRC (Radio Resource Control) message.

12. The UE of claim 11, wherein the UE cannot derive a slot format according to the group common PDCCH without the configuration.

13. The UE of claim 11, wherein the configuration is specifically for the UE.

14. The UE of claim 11, wherein the UE receives information regarding which configured set of symbols is present.

15. The UE of claim 11, wherein a set of symbols is a basic unit for the group common PDCCH to provide information.

16. The method of claim 1, wherein the configuration indicates a sequence of different types of minimum function blocks, and each type of minimum function block comprises a different functionality for the minimum function block.

17. The UE of claim 11, wherein the configuration indicates a sequence of different types of minimum function blocks, and each type of minimum function block comprises a different functionality for the minimum function block.

18. A base station (BS), comprising:
a control circuit;
a processor installed in the control circuit; and
a memory installed in the control circuit and operatively coupled to the processor;
wherein the processor is configured to execute a program code stored in the memory to:
signal a first configuration to a first UE (User Equipment) which indicates one or more functionalities of each symbol within a plurality of minimum function blocks,
wherein a group common PDCCH (Physical Downlink Control Channel) associated with a slot indicates:
a presence of the plurality of minimum function blocks; and
a sequence of the plurality of minimum function blocks; and
determine for the first UE a slot structure for the slot according to:
the one or more functionalities, of each symbol within the plurality of minimum function blocks, indicated by the configuration; and
the sequence of the plurality of minimum function blocks indicated by the group common PDCCH,
wherein the first configuration is transmitted by an RRC (Radio Resource Control) message.

* * * * *

UNITED STATES PATENT AND TRADEMARK OFFICE
CERTIFICATE OF CORRECTION

| | |
|---|---|
| PATENT NO. | : 10,912,070 B2 |
| APPLICATION NO. | : 15/868419 |
| DATED | : February 2, 2021 |
| INVENTOR(S) | : Ko-Chiang Lin et al. |

Page 1 of 1

It is certified that error appears in the above-identified patent and that said Letters Patent is hereby corrected as shown below:

In the Claims

Column 32 Claim 6, Line 10, please insert the word -- a -- after "of each symbol within" and before "plurality of minimum";

Column 32 Claim 6, Line 26, please replace the word "Contrail", with the correct word -- Control --;

Column 34 Claim 18, Line 19, please insert the word -- first -- after "indicated by the" and before "configuration; and".

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*